(12) United States Patent
Lee et al.

(10) Patent No.: US 8,379,733 B2
(45) Date of Patent: Feb. 19, 2013

(54) EFFICIENT VIDEO PACKETIZATION METHODS FOR PACKET-SWITCHED VIDEO TELEPHONY APPLICATIONS

(75) Inventors: Yen-Chi Lee, San Diego, CA (US); Jill Olson, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1459 days.

(21) Appl. No.: 11/535,380

(22) Filed: Sep. 26, 2006

(65) Prior Publication Data

US 2008/0084933 A1   Apr. 10, 2008

(51) Int. Cl.
*H04N 7/12* (2006.01)
(52) U.S. Cl. ......... 375/240.26; 375/240.01; 375/240.02; 375/240.08; 375/240.12
(58) Field of Classification Search ............. 375/240.01, 375/240.02, 240.08, 240.12, 240.26
See application file for complete search history.

(56) References Cited

U.S. PATENT DOCUMENTS

| | | | |
|---|---|---|---|
| 6,215,820 B1 | 4/2001 | Bagni et al. | |
| 6,304,607 B1 | 10/2001 | Talluri et al. | |
| 6,490,320 B1 * | 12/2002 | Vetro et al. | 375/240.08 |
| 6,530,055 B1 | 3/2003 | Fukunaga | |
| 6,545,557 B2 | 4/2003 | Nagata | |
| 6,768,775 B1 | 7/2004 | Wen et al. | |
| 7,027,515 B2 | 4/2006 | Lin | |
| 7,027,517 B1 | 4/2006 | Nagai et al. | |
| 7,124,429 B2 | 10/2006 | Nagai et al. | |
| 7,133,451 B2 | 11/2006 | Kim et al. | |
| 7,173,946 B2 | 2/2007 | Park et al. | |
| 7,194,000 B2 | 3/2007 | Balachandran et al. | |
| 7,340,667 B2 | 3/2008 | Saado et al. | |
| 7,428,684 B2 | 9/2008 | Homm et al. | |
| 7,885,337 B2 | 2/2011 | Lee et al. | |
| 2003/0014705 A1 | 1/2003 | Suzuki et al. | |

(Continued)

FOREIGN PATENT DOCUMENTS

| | | |
|---|---|---|
| CN | 1511420 A | 7/2004 |
| EP | 1089570 A2 | 4/2001 |

(Continued)

OTHER PUBLICATIONS

International Search Report—PCT/US07/079417, International Search Authority—European Patent Office—May 23, 2008.

(Continued)

*Primary Examiner* — Sath V Perungavoor
*Assistant Examiner* — Geepy Pe
(74) *Attorney, Agent, or Firm* — Heejong Yoo

(57) ABSTRACT

A device having an encoder and a packet switched video assembler which first estimates how many packets should be generated for one frame based on an estimated frame size and an initial fixed target packet size. Then, an updated packet size is recalculated on a packet-by-packet or slice-by-slice basis. The video assembler includes a three-stage process. The first stage estimates the frame size with or without encoding the video sequence, wherein in the case where the first stage includes encoding, the encoded data is packed in to a simulation bitstream. The second stage estimates the number of packets using the target packet size, estimated frame size and a configuration mode. The third stage dynamically updates the packet size using one-MB look-ahead approach with pre-encoding each MB. In an alternate embodiment, the third stage turns off the look ahead feature when encoding a current macroblock takes place during the third stage.

50 Claims, 22 Drawing Sheets

U.S. PATENT DOCUMENTS

| | | |
|---|---|---|
| 2004/0199850 A1 | 10/2004 | Yi et al. |
| 2005/0259613 A1 | 11/2005 | Garudadri et al. |
| 2006/0062312 A1 | 3/2006 | Lee et al. |
| 2008/0232478 A1 | 9/2008 | Teng et al. |
| 2009/0213938 A1 | 8/2009 | Lee et al. |

FOREIGN PATENT DOCUMENTS

| | | |
|---|---|---|
| JP | 06070306 | 3/1994 |
| JP | 9200743 A | 7/1997 |
| JP | 2000078197 | 3/2000 |
| JP | 2000175189 A | 6/2000 |
| JP | 2000307672 | 11/2000 |
| JP | 2003023413 | 1/2003 |
| JP | 2003078565 | 3/2003 |
| JP | 2004056169 | 2/2004 |
| JP | 2005295054 A | 10/2005 |
| JP | 2007019979 A | 1/2007 |
| WO | WO0160011 A2 | 8/2001 |
| WO | WO03041326 | 5/2003 |

OTHER PUBLICATIONS

Written Opinion—PCT/US07/079417, International Search Authority—European Patent Office—May 23, 2008.

International Preliminary Report on Patent Ability—PCT/US07/079417. International Search Authority—European Patent Office—Munich—Jan. 12, 2009.

Hourunranta, A. J., "Video error resilience in 3G-324M videophones," in Proc. Intl. Conference on Information System, Analysis and Synthesis, vol. 4, 2001.

Masala et al., "Rate-distortion optimized slicing, packetization and coding for error resilient video transmission," in Proc. Data Compression Conference (DCC'04), 2004.

Wegner S., "H.264/AVC over IP" IEEE Transactions on Circuits and Systems for Video Technology, vol. 13, No. 7, pp. 645-656, Jul. 2003.

Chang, Y. C. et al. "Performance Evaluation of MPEG-4 Visual Error Resilient Tools Over a Mobile Channel". IEEE Transactions on Consumer Electronics, vol. 49, No. 1. Feb. 2003.

"Description of Core Experiments on Error Resilience in MPEG-4 Video," Joint Video Team of ISO-IEC MPEG & ITU-T VCEG (ISO/IEC JTC1/SC29/WG11 and ITU-T SG16 Q6) No. N1646, Apr. 11, 1997, Sections 1.2, 5.3.1, 5.3.2.3, Sections 5.6 E10 and 5.7 E.11, XP030010413.

Garudadri H: "Video Quality Evaluation Procedure" TSG-C WG1.2 Conference Call, C12, 'Online Nov. 20, 2003, XP002358370.

Garudadri: "Video Delivery in cdma2000 Networks" TSG-C SWG1.2 AD HOC, Montreal Quebec, Online! May 17, 2004, XP002358369.

Gennari, et al., H-264 Robust Decoder for Wireless Environments (12 pages).

Hagenauer, et al.; "Error Robust Multiplexing for Multimedia Applications"; Signal Processing: Image Communication 14; Elsevier Science B.V.; 1999; pp. 585-597.

Hua Yang et al: "Mismatch Impact on Per-Pixel End-to-End Distortion Estimation and Coding Mode Selection", IEEE International Conference on Multimedia and Expo, 2007 , IEEE, Jul. 1, 2007, pp. 2178-2181, XP031124091 ISBN: 978-1-4244-1016-3.

Liang, et al.; "Tools for Robust Image and Video Coding in JPEG2000 and MPEG4 Standards"; IS&T/SPIE onference on Visual Communications and Image Processing; Jan. 1999; pp. 40-51.

Superiori, et al., Performance of a H-264/AVC Error Detection Algorithm Based on Syntax Analysis (2005) (17 pages).

Talluri, Raj; "Error-Resilient Video Coding in the ISO MPEG-4 Standard"; IEEE Jun. 1998; pp. 112-119.

Xiaowei Ding, et al., "A novel bitstream level joint channel error concealment scheme for realtime video over wireless networks", Twenty-Third Annual Joint Conference of the IEEE Computer and Communications Societies, (INFOCOM 2004) IEEE, Piscataway, NJ, USA, vol. 3, 7 Mar. 2004, pp. 2163-2173, XP010740571 ISBN: 978-0-7803-8355-5.

Yao Wang et al: "Error Resilient Video Coding Techniques—Real-Time Video Communications over Unreliable Networks," IEEE Signal Processing Magazine, IEEE Service Center, Piscataway, NJ, US, vol. 17, No. 4, Jul. 1, 2000, pp. 61-82, XP11089872.

\* cited by examiner

EFFICIENT VIDEO PACKETIZATION METHODS FOR PACKET-SWITCHED VIDEO TELEPHONY APPLICATIONS

BACKGROUND OF THE INVENTION

1. Field of the Invention

This invention relates to video packetization in packet switched video telephone applications.

2. Background

A video slice typically starts with a resynchronization marker (RM) or slice header that can be used by the decoder to re-establish synchronization when errors are detected. In particular, RMs are generally only placed at macroblock (MB) boundaries, and cannot be placed arbitrarily within the video frame. Thus, adjusting the video slice size is difficult for the encoder so that one or more MBs fit exactly within a given packet.

One technique for a video slice alignment involves slice-level rate control to adjust the quantization step-size of MBs to adjust the slice length. Unfortunately, this technique adds significant complexity to the encoder design, and is not necessarily exact. Another technique involves encoding a slice until its size exceeds a predefined length, and then adding padding bytes between the end of the encoded video and the end of the slice. However, this approach undermines bandwidth efficiency.

Traditional methods make one video packet when the number of bits that have been generated exceeds a pre-defined size. Thus, there is a problem with having many small video packets that require additional RTP/UDP/IP/PPP overhead for transmission while providing unnecessary error protection over the last few bytes of video data in one frame. Even if a look-ahead approach can be used to estimate how many bits are left, traditional methods still cannot completely avoid small packets.

Re-encoding the bitstream will not solve the problem. Instead, re-encoding requires multiple runs of encoding to find the optimal solution that fits into the pre-defined size. In addition, re-encoding is not implementation friendly for mobile device applications.

Video packetization has been a challenging problem in packet switched (PS) video applications as it involves a trade-off of packetization efficiency and error resiliency. Sending a video packet requires 40 bytes of overhead including RTP/UDP/IP headers. If the packet is small, the overhead to data ratio will be high, and hence it is inefficient in terms of bandwidth. For example, if a packet is sent with 40-byte video data, then the overhead is 100%. In such a case, it is highly desirable for a video encoder to generate video packets with a sufficient amount of data to avoid inefficient packetization in terms of bandwidth.

In most video packetization schemes (hereinafter referred to as the "original packetization approach"), a pre-defined video packet size is usually specified and video encoder will try to generate all the video packets that are around this packet size. One way of doing so is to check if the video data that has been generated exceeds the pre-defined packet size. If yes, the video encoder will make a video slice by inserting a resynchronization marker (RM). However, the original packetization approach cannot guarantee all the video packets will have the pre-define size. Very often some very small size packets will be generated at the end of a video frame. That is, the original packetization approach cannot provide efficient packetization thus the bandwidth is often wasted while unnecessarily protecting the last few bytes. The results of using the original packetization approach using 120-bytes as a target packet size is shown in FIG. 1A. As can be readily seen, many small packets (shown in a circle for emphasis) are generated for the original packetization approach.

The pre-defined video packet size is usually specified and the encoder checks if the video data that has been generated exceeds the pre-defined packet size. Some heuristic approaches such as to check if the encoding reaches the last M (e.g. M=5) MBs can be used. If yes, the video encoder does not generate a video packet even if the amount of data has exceeded the pre-defined video packet size. Thus, the heuristic approach is not implementation friendly for mobile device applications and it also cannot achieve exact packet size. The results of using the heuristic packetization approach using 120-bytes as a target packet size is shown in FIG. 1B. As can be readily seen, many small packets (shown in a circle for emphasis) are generated for the heuristic approach.

SUMMARY OF THE INVENTION

In view of the above, it is an object of the present invention to solve the problem of having many small video packets that require additional RTP/UDP/IP/PPP overhead for transmission while providing unnecessary error protection over the last few bytes of video data in one frame.

It is an object of the present invention to avoid any small packets to improve packetization efficiency while providing comparable error resiliency.

It is a further object of the present invention to reduce the number of packets and improve bandwidth utilization.

It is a further object of the present invention to reduce the number of packets and improve bandwidth utilization in MPEG4, H.263, H,264 and/or H.223 based packetization for WCDMA Circuit-Switched based video telephony (VT).

It is an object of the present invention to divide video frames into (roughly) equally sized packets for packet-switched (PS) video telephony (VT) applications.

It is an object of the present invention to accurately estimate where to place a resynchronization maker (RM) for MPEG-4 video, or slice header for H.263 video to avoid any small packets which improves packetization efficiency while providing comparable error resiliency.

In view of the above objects, the present invention is carried out by a packet-switched video telephony device comprising an encoder operable to encode a video sequence to create an encoded video data and a packet switched video assembler operable to packetize the encoded video data into dynamically adjusted packets by estimating a number of packets to be generated for a frame based on an estimated frame size and iteratively calculating an updated packet size, based on at least the estimated frame size and the number of packets, on a packet-by-packet basis, while the encoded video data is packed into an actual bitstream. The device also includes a transmitter for transmitting the actual bitstream.

The packet switched video assembler includes a three-stage process. The first stage estimates the estimated frame size with or without packing encoded macroblocks in a simulation bitstream. The second stage determines the number of packets using the estimated frame size, a target size and a configuration mode. The third stage dynamically updates the packet size on a packet-by-packet or slice-by-slice basis, using a one-macroblock look ahead during packing of the bitstream, when the macroblocks are encoded in the first stage.

Another aspect of the present invention is to provide program code having program instructions which upon execution by a processor are operable to encode a video sequence to create an encoded video data. The program instructions are also operable to estimate a number of packets to be generated for a frame based on an estimated frame size; and iteratively calculate an updated packet size, based on at least the estimated frame size and the number of packets, on a packet-by-packet basis, while the encoded video data is packed into an actual bitstream.

A still further aspect of the present invention is to provide a method comprising the steps of: encoding a video sequence to create an encoded video data; and dynamically adjusting packets of the encoded video data by estimating a number of packets to be generated for a frame, based on an estimated frame size, and iteratively calculating an updated packet size, based on at least the estimated frame size and the number of packets, on a packet-by-packet basis, while the encoded video data is packed into an actual bitstream.

A still further aspect of the present invention is to provide an encoder comprising a macroblock encoding module operable to encode a video sequence to create an encoded video data having macroblocks; and a packet switched video assembler operable to packetize the encoded video data into dynamically adjusted packets by iteratively calculating an updated packet size, on a slice-by-slide basis, while the encoded video data is packed into an actual bitstream, the updated packet sized being a function of an estimated frame size derived from a fixed initial target frame size and an estimated number of packets, The feature of the present invention is to first estimate how many packets should be generated for one frame based on the (estimated) frame size and an initial fixed target packet size. Then a new target packet size is calculated which is performed on a frame-by-frame basis. Hence, instead of using a fixed target packet size, a new target packet size is updated dynamically for the remaining packets.

Another feature of the present invention is that if the frame size information is not available, information which is a function of the number of non-zero DCT coefficients is used to estimate the frame size.

A further feature of the present invention is that the program code decides where to place resynchronization markers (RMs) so that the size of each packet is roughly equal in a simulation bitstream and/or an actual bitstream. The method also adopts a one-MB look-ahead approach with or without pre-encoding each macroblock (MB).

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement shown. In the drawings.

DETAILED DESCRIPTION OF THE PREFERRED EMBODIMENTS

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

The preferred embodiment of the packet-switched video telephony device according to the present invention is described below with a specific application to video packetizing. The packet-switched video telephony device may be a handheld or mobile device such as a mobile wireless or cellular phone However, it will be appreciated by those of ordinary skill in the art that the present invention is also well adapted for other types of devices, including computing devices with packet-switched video telephony applications. The packet-switched video telephony applications may include MPEG-4 video standards, H.263 and H.264 video and H.223 based for packetization of Wideband Code Division Multiple Access (WCDMA) Circuit-Switched video telephone (VT).

Figure 1A:
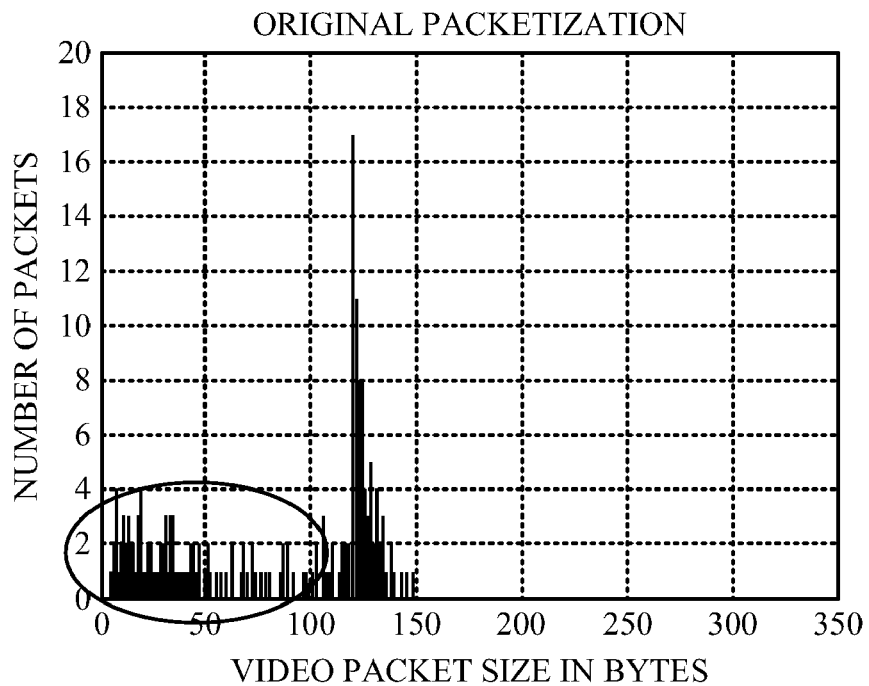
FIG. 1A illustrates a graph of the video packet size in bytes versus the number of packets for an original packetization approach using a target packet size of 120 bytes.
Figure 1B:
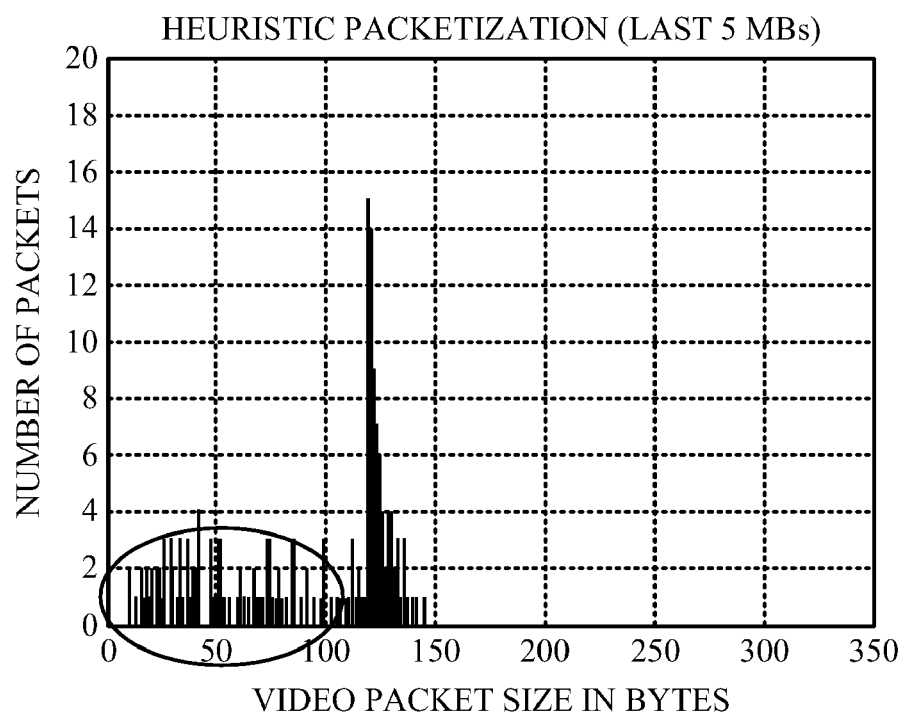
FIG. 1B illustrates a graph of the video packet size in bytes versus the number of packets for an heuristic packetization approach using a target packet size of 120 bytes.
Figure 2:
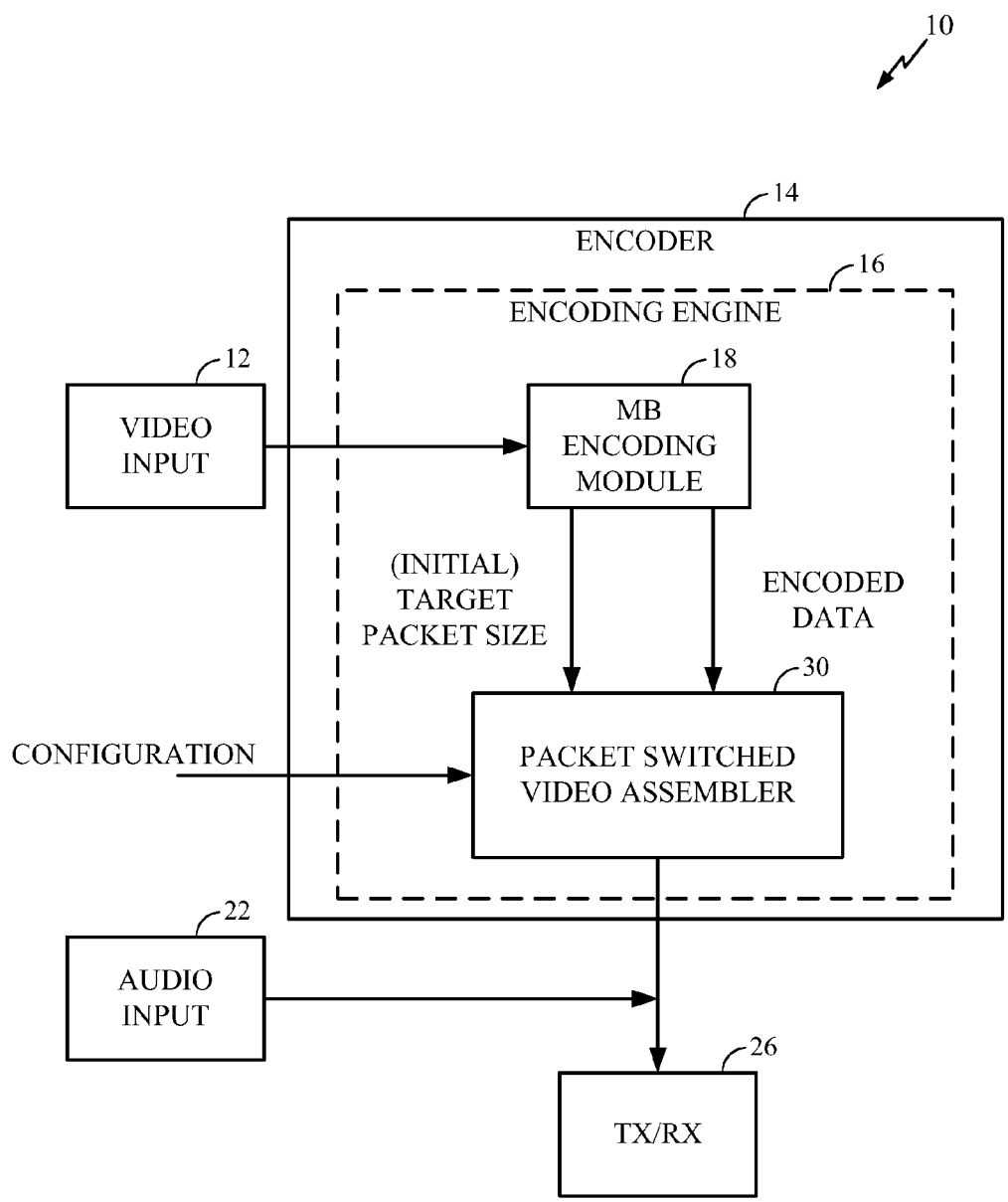
FIG. 2 illustrates a general block diagram of a packet-switched video telephony device in accordance with the present invention.

Referring now to the drawings in detail, wherein like numerals are used to indicate like elements throughout, there is shown in FIG. 2 an embodiment of a packet-switched video telephony device, generally designated at 10, according to the present invention.

The packet-switched video telephony device 10 includes a video input 12 and an encoder 14 having an encoding engine 16 operable to encode the captured video images and sequences. The encoding engine 16 has embedded therein a packet switched video assembler 30 which packetizes the encoded video sequences into a bitstream. The output of the packet switched video assembler 30 is coupled to a transmitter/receiver 26 for communication of the bitstream over a communication medium suitable for packet-switched video telephony signals compatible with MPEG-4 video standards, H.263 and H.264 video and H.223 based for packetization of WCDMA Circuit-Switched VT.

Typically, the packet switched video assembler 30 is embedded in the encoding engine 16, where the slices are determined during encoding. "During encoding" here means the encoding engine 16 encodes data (such as motion vectors and quantized coefficients) of macroblocks (MBs) in a MB encoding module 18 for a frame and puts the encoded MB data into a bitstream. Thus, the encoding engine 16 has the capability to generate video slices to a pre-defined target size based on the present invention and is a processor with program instructions.

The packet-switched video telephony device 10 also includes an audio input 22 which is shown, for simplicity, coupled to and/or combined with the output signal of the packet switched video assembler 30 of the encoding engine 16. The detailed description herein is primarily directed to the video packetization aspects or packet-switched video telephony signals compatible with MPEG-4 video standards, H.263 and H.264 video and H.223 based for packetization of WCDMA Circuit-Switched VT.

Figure 3:
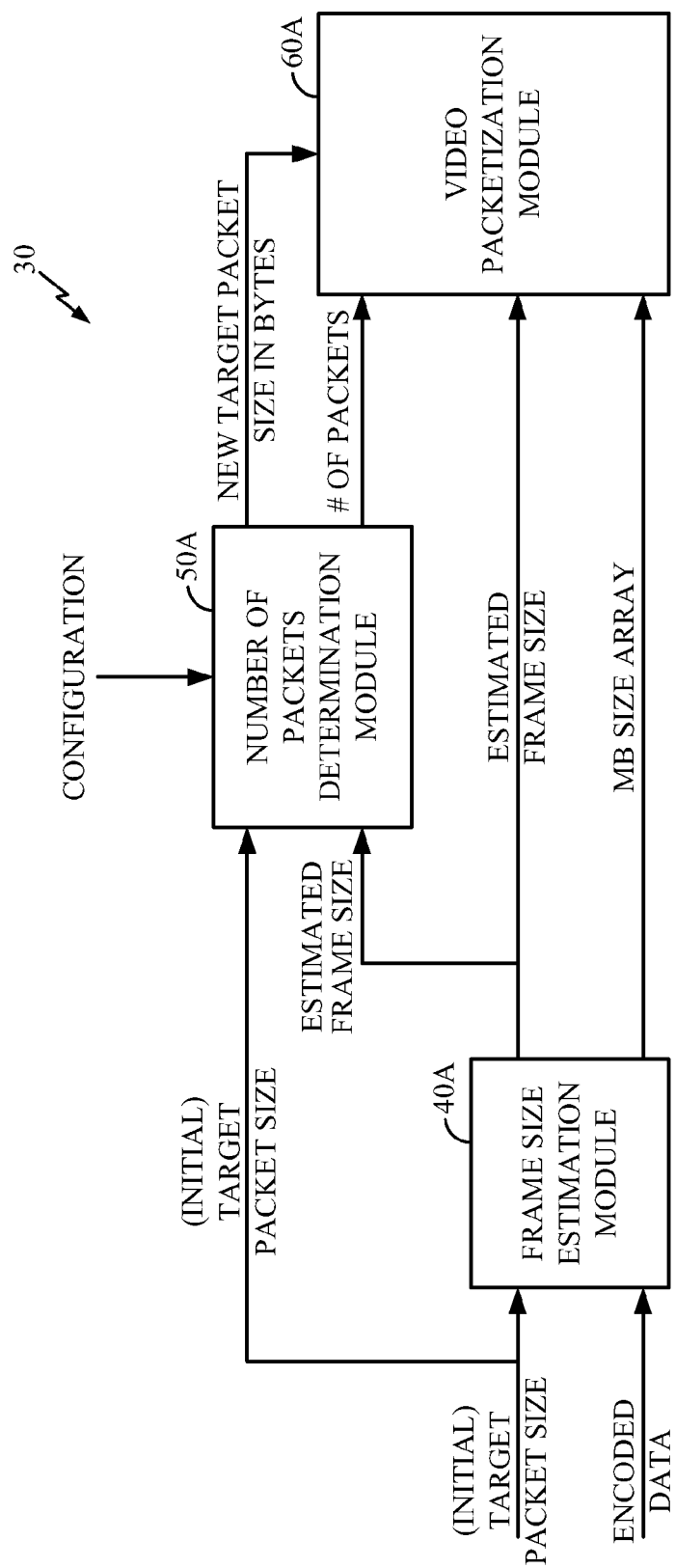
FIG. 3 illustrates a general block diagram of the packet switched video assembler in accordance with the present invention.

Referring now to FIG. 3, the packet switched video assembler 30 comprises, in general, a frame size estimation module 40A, a number of packet determination module 50A and a video packetization module 60A which are arranged to find out how many packets should be generated for the current frame, based on an initial target packet size in the number of packets determination module 50A. However, without knowing the actual frame size, the number of packets to be generated cannot be determined. Furthermore, the packet switched video assembler 30 is arranged to estimate the frame size in the frame size estimation module 40A. Finally, the video packetization module 60A employs both the estimated frame size and number of packets determination to packetize the encoded video sequence.

These two modules (frame size estimation module 40A and the number of packets determination module 50A) are important to make video packetization by the video packetization module 60A robust. After the number of packets has been determined by the number of packets determination module 50A, the packet switched video assembler 30 recalculates the target frame size in the actual video packetization (VP) process 150 (FIG. 6), carried out by the video packetization module 60A.

Figure 14A:
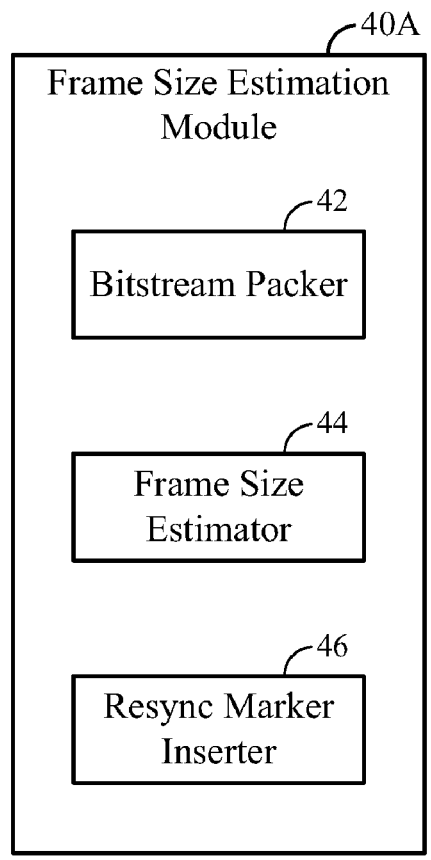
FIG. 14A illustrates a general block diagram of the frame size estimator module of FIG. 3.
Figure 15A:
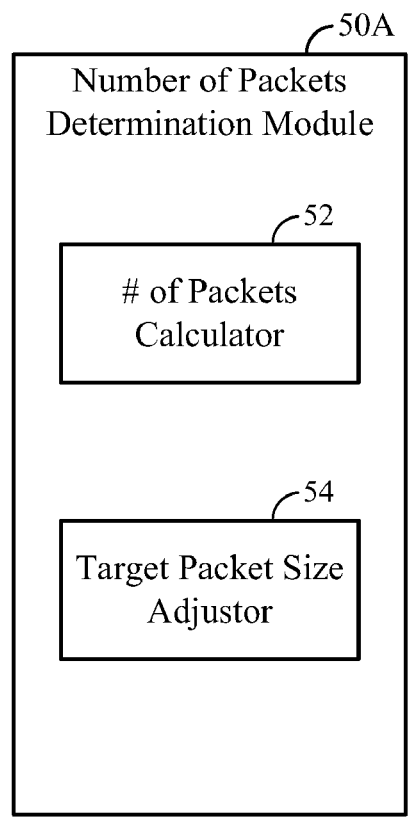
FIG. 15A illustrates a general block diagram of the number of packets determination module of FIG. 3.

The frame size estimation module 40A includes a bitstream packer 42, a frame size estimator 44 and a resync marker inserter 46, as best seen in FIG. 14A. The number of packets determination module 50A includes a number of packets calculator 52 and target packet size adjustor 54, as best seen in FIG. 15A. The target packet size adjustor 54 calculates a new target packet size based on the estimated frame size from the frame size estimator 44 of module 40A. The number of packets calculator 52 determines the number of packets based on the estimated frame size, the target packet size and the configuration mode. The video packetization module 60A includes a bitstream packer 62, a resync marker distributor 64 and packet size adjustor 66. The resync marker distributor 64 inserts the resynchronization marker or slice header so that the size of each packet is roughly the same or within a range.

The range is generally between 100 and 150 bytes. The packet size adjustor 66 dynamically updates the target packet size (updated packet size) dynamically using one MB lookahead. In the exemplary embodiment, the result of the current packet size added to a portion of the next (look ahead) MB denoted as MB[i+1] is compared to the updated packet size. Once the result is greater than the updated packet size, the resync marker is inserted by the resync marker distributor 64 and the updated packet size recalculated. The MB is packed into the bitstream until, the updated packet size is less than the result of the current packet size and a portion of one look ahead macroblock (MB[i+1]).

Second, after the number of packets to be generated is known, the resynchronization marker (RM) is distributed within the frame so that the size of each video packet in the frame is roughly the same. This will require a tracking and updating process during the actual video packetization process 150. The tracking tracks how many bytes have been generated as mentioned before. However, an additional step to look ahead one more MB either in bytes or in NZC (number of non-zero coefficients), depending on the availability of the information and algorithms. The updating process recalculates the target video size (in bytes or in NZC) according to the frame size (total NZC budget) and the size of previous packets so that the video packetization can evenly distribute the size of the remaining packets.

Approach 1

The packet switched video assembler 30 includes, in general, three-modules, a frame size estimation module 40A, a number of packets determination module 50A and a video packetization module 60A which carry out a three-stage process for video packetization to evenly distribute the bytes into packets. The frame size estimation module 40A receives an initial target packet size and encoded data from the encoding engine 16. The number of packets determination module 50A also receives the target packet size and an estimated frame size from the frame size estimation module 40A. The frame size estimation module 40A also sends the estimated frame size and a MB size array to the video packetization module 60A. The number of packets determination module 50A sends the video packetization module 60A the number of packets and the new target packet size in bytes.

Figure 4A:
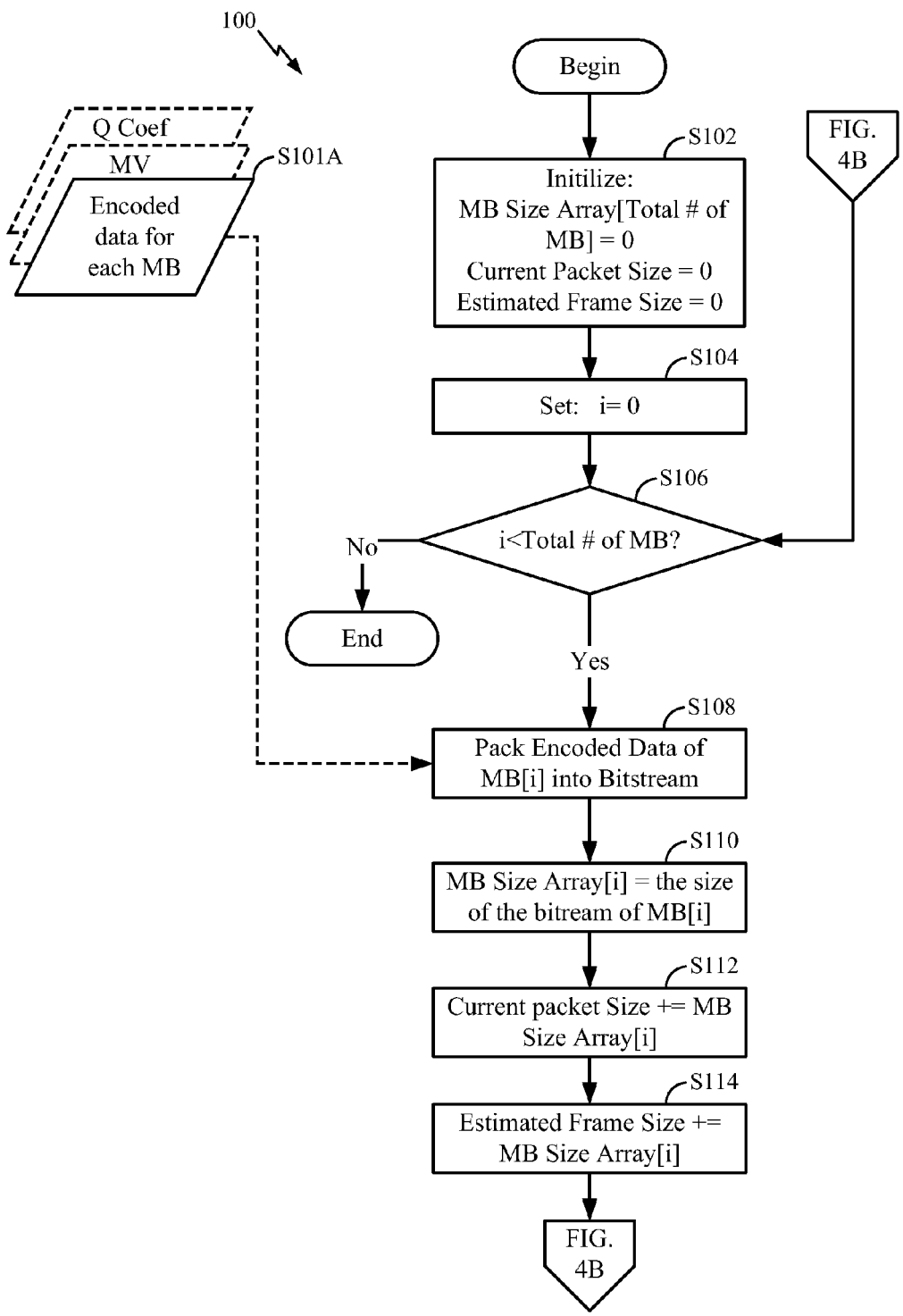
FIGS. 4A-4B illustrate a flowchart of a frame size estimation (FSE) process in accordance with the present invention.
Figure 4B:
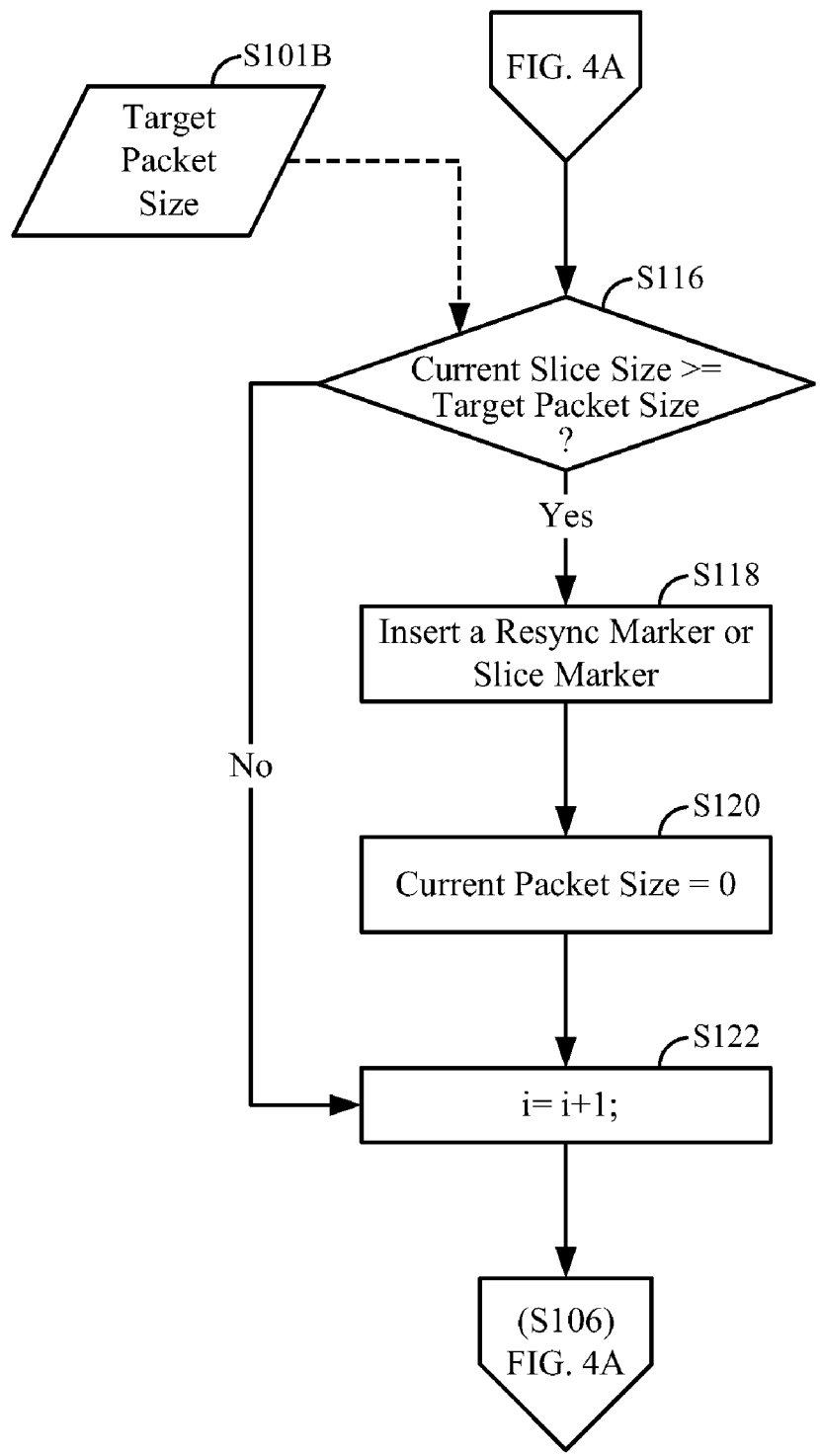

Referring now to FIGS. 4A, 4B, 5 and 6A-6B, the three-stage process carried out by the packet switched video assembler 30 is shown. In Stage 1, a frame size estimation (FSE) process 100 is performed by the frame size estimation module 40A. In Stage 2, a number of packets determination process 130 is performed by the number of packets determination module 50A. In Stage 3, a video packetization (VP) process 150 is performed by the video packetization module 60A. In Stage 1, as best seen in FIGS. 4A-4B, the FSE process 100 estimates the frame size (step S114) by going through actual bitstream packing first (step S108) in order to determine the number of packets (step 138 in process 130, FIG. 5) that should be generated for the frame. This estimated frame size (step S114) gives a very accurate frame size with just a few bytes difference from the actual frame size. With this accurate frame size estimation, the number of packets (step S138) in Stage 2 can be reliably generated for the frame. In addition, while packing the bitstream (step S158), in the VP process 150 of Stage 3, an estimate of how many bits will be (roughly) generated (steps S160, 162) and this information can help the video packetization to re-estimate the packet size (step S170) to use.

More specifically, the details of (Stage 1) the frame size estimation (FSE) process 100 will now be described in more detail. The FSE process 100 assumes a (given) initial target packet size in bytes at step S101B and the encoded data for each MB such as motion vectors and quantized coefficients has been stored at S101A. Step 102 initializes the following parameters:

MB_Size_Array[total number of MB] to be zero;
current_packet_size=0; and
estimated_frame_size=0.

Step S102 is followed by step S104 where a counter i is set to 0. Step S014 is followed by step S106 where a determination is made whether the counter i is less than the total number of MBs. If the determination is "YES," the FSE process 100 first goes through actual bitstream packing of a MB[i] at step S108 using the encoded data for each MB at step S101A from the encoding engine 16. Thus, a simulation bitstream is created. Step S108 is followed by step S110 where the MB size array[i] is set equal to the size of the bitstream of MB[i]. Step S110 is followed by step S112 where the current packet size is calculated as current_packet_size+=MB_Size_Array[*i*] or current_packet_size=current_packet_size+MB_Size_Array[*i*].

In general, the formula accumulates the current packet size for each MB[i] until the current packet size is reset.

Step S112 is followed by step S114 where the estimated frame size is accumulated. The formula in step S114 to calculate the estimated frame size is defined as estimated_frame_size+=MB_Size_Array[*i*] or estimated_frame_size+=MB_Size_Array[*i*]+
estimated_frame_size.

This estimated frame size at step S114 gives a very accurate frame size with just a few bytes difference from the actual frame size obtained. With this accurate frame size estimation, the number of packets can be reliably generated for the frame in (Stage 2) the number of packets determination (NPD) process 130 described in detail later.

In addition, while packing the bitstream in (Stage 3) an estimation of how many bits will be (roughly) generated and this information can help the video packetization to re-estimate the packet size used.

Returning again to the FSE process 100, the step S114 is followed by step S116 where a determination is made whether the current slice size is greater than or equal to (>=) the target packet size. Thus, steps S106, S108, S110, S112 and S114 are repeated until the current slide size is greater than or equal to (>=) the target packet size or the counter i is < the number of MBs. (The initial target packet size S101B being sent from the encoding engine 16.)

The initial target packet size is specified/defined prior to the encoding. That is, a user/application may specify a target size of, for example, 120-bytes. The use of the initial target packet size makes the FSE process 100 more accurate during Stage 1. In Stage 1, the resync marker (RM) insertion is just to make the frame size estimation module 40A more accurate as the RM also includes bits. Moreover, by inserting RMs, the encoding process will be slightly changed as the motion vector predictions and the spatial prediction will have to be stopped across slice boundaries. The slice determination in Stage 1 is not the final result but rather a rough idea (simulation) of how the video slicing in Stage 3 will be to make frame size estimation more accurate for the assembly of the actual bitstream.

Returning to step S116, if at step S116, the determination is "NO." the FSE process 100 updates the counter i by one (1) at step S122 and returns to step S106 where the estimated frame size is accumulated for the MBs by packing one or more of the MBs into the bitstream.

Otherwise, if the determination, at step S116, is "YES," (the end of the slice or packet size) then the FSE process 100 will insert a resync marker (RM) or slice marker at step S118. The RM is inserted at the beginning of the next MB. Step S118 is followed by step S120 where the current packet size is set equal to zero (0). Step S120 then follows to step S122 where the counter i is incremented by one (1) and returns to step S106 (FIG. 4A) to repeat the packing. Otherwise, at step S106 if the determination is "NO" (meaning no more MBs), then the FSE process 100 ends.

Returning now to FIG. 5, the (Stage 2) number of packets determination (NPD) process 130 by the number of packets determination module 50A will now be described. The initial target packet size in bytes represented at step S131B is given and the estimated frame size represented at step S131C was calculated in Stage 1 above. The configuration represented at step S131A is set by the user/application, in the configuration mode. The configuration includes a bandwidth efficient mode and an error resilient mode. The NPD process 130 begins with step S132 where a determination is made whether the configuration equals (=) bandwidth efficient mode. If the determination at step S132 is "YES," step S132 is followed by step S134 where the number of packets is defined by number_of_packet=FLOOR(estimated_frame_size/
target_packet_size);

where the FLOOR function is the same as rounding the result of the operation ( ) downward to the next integer. Step S134 is followed by step S140 where the new target packet size is defined by new_target_packet_size=ROUND(estimated_frame_
size/number_of_packet);

where the ROUND function rounds the result of the operation ( ).

On the other hand, if the determination at step S132 is "NO," step S132 is followed by step S136 where a determination is made whether the configuration is set to the error resilient mode. If at step S136 the determination is "YES," Step S136 is followed by step S138 where the number of packets is defined by number_of_packet=ROUND(estimated_frame_size/
target_packet_size).

Step S138 is followed by step S140 where the new target packet size is calculated as described above. Thereafter, the NPD process 130 ends.

Returning now to FIGS. 6A-6B, the (Stage 3) video packetization (VP) process 150 is shown. In the VP process 150, it is assumed that the data has been encoded by the encoding engine 16 and sent as encoded data for each MB. The estimated frame size represented at step S151E and the MB Size Array S151C are derived from the FSE process 100 in Stage 1. The number of packets S151D and the new target packet size S151A were calculated in the NPD process 130 of Stage 2 for the configuration mode selected.

The VP process 150 begins with initializing at step S152 the following parameters:
current_packet_size=0;
updated_packet_size=new_target_packet_size;
accumulated_frame_size=0; and
packet_count=0.

Step S152 is followed by step S154 where a counter i is set to zero (0). Step S154 is followed by step S156 where a determination is made whether the counter i is less (<) the number of MBs. If the determination at step S156 is "YES," then step S156 is followed by step S158 where the encoded data is packed into the actual bitstream. Step S158 is followed by step S160 where the current packet size is defined by current_packet_size+=size of MB[i] from above; or current packet_size=current_packet size+size of MB[i];

and the accumulate frame size in step S162 is defined by accumulated_frame_size+=MB_Size_Array[i] or accumulated_frame_size=accumulated_frame_size+ MB_Size_Array[i].

Step S162 is followed by step S164 where a determination is made whether (current_packet_size+(MB_Size_Array[i+1]/2))> updated_packet_size)

where MB_Size_Array[i+1] is the size of the next MB denoted as MB[i+1]. The result of the current packet size plus a portion of the size of the MB size array of the next MB[i+1] is compared to the updated packet size. In the exemplary embodiment the portion of the size of the MB size array is one-half. If the determination at step S164 is "YES," then step S164 is followed by step S166 where determination is made whether (packet_count<number_of_packet−1)).

If either or both of the determinations at steps S164 and S166 are NO, then steps S164 or S166 are followed by step S176 where the counter i is incremented by 1 and packing at step S158 of the next MB[i] into the bitstream continues unless the counter i is less (<) then the total number of MBs (meaning no more MBs).

If the determination at steps S164 and S166 are both "YES," then Step S166 is followed by step S168 where a Resynchronization Marker (RM) or Slice header is inserted. Step S168 is followed by step S170 where the update of the packet size (update packet size) is calculated and is defined by updated_packet_size=(estimated_frame_size− accumulated_frame_size)/(number_of_packets− packet_count−1).

Figure 6A:
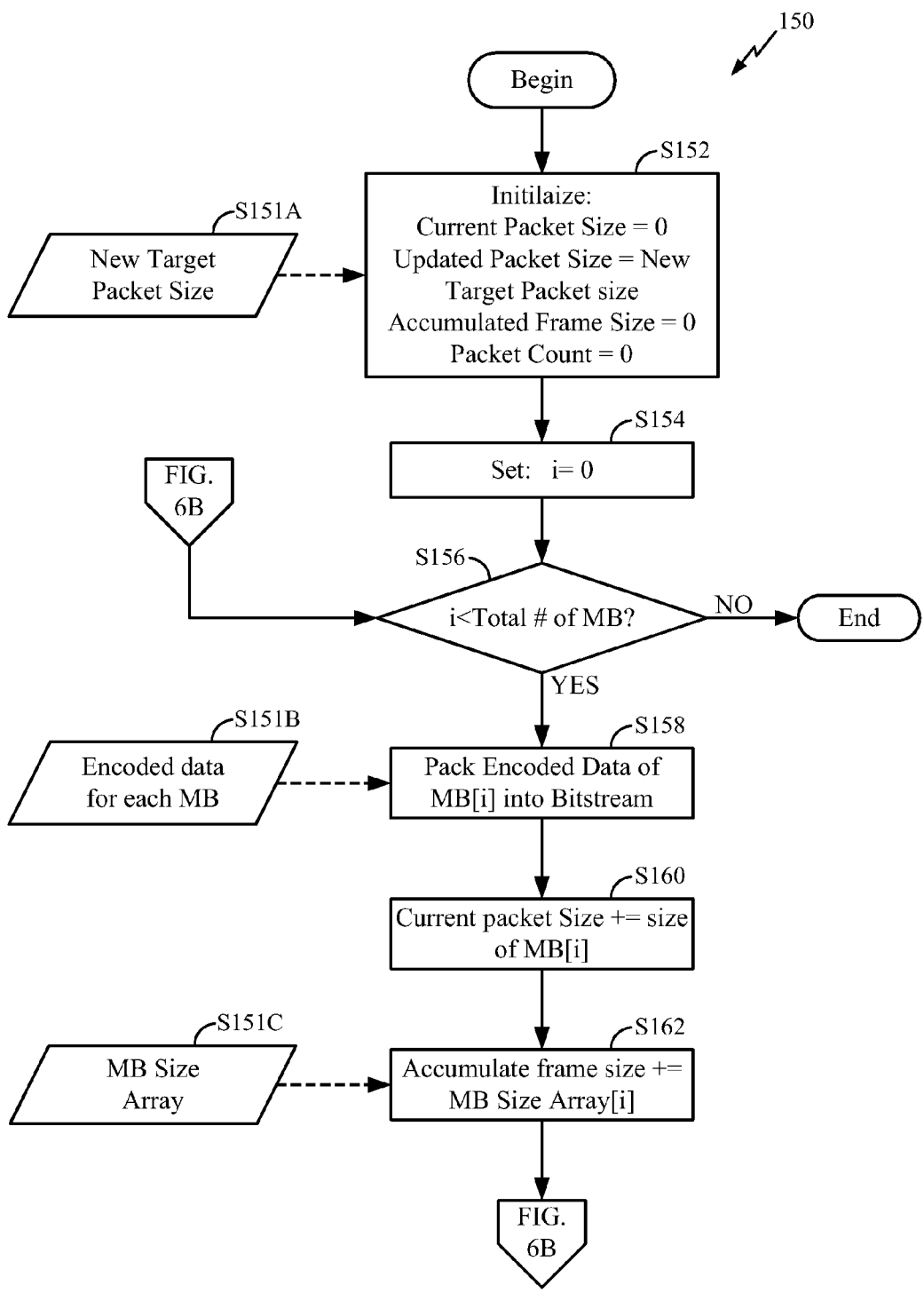
FIGS. 6A-6B illustrate a flowchart of a video packetization (VP) process in accordance with the present invention.
Figure 6B:
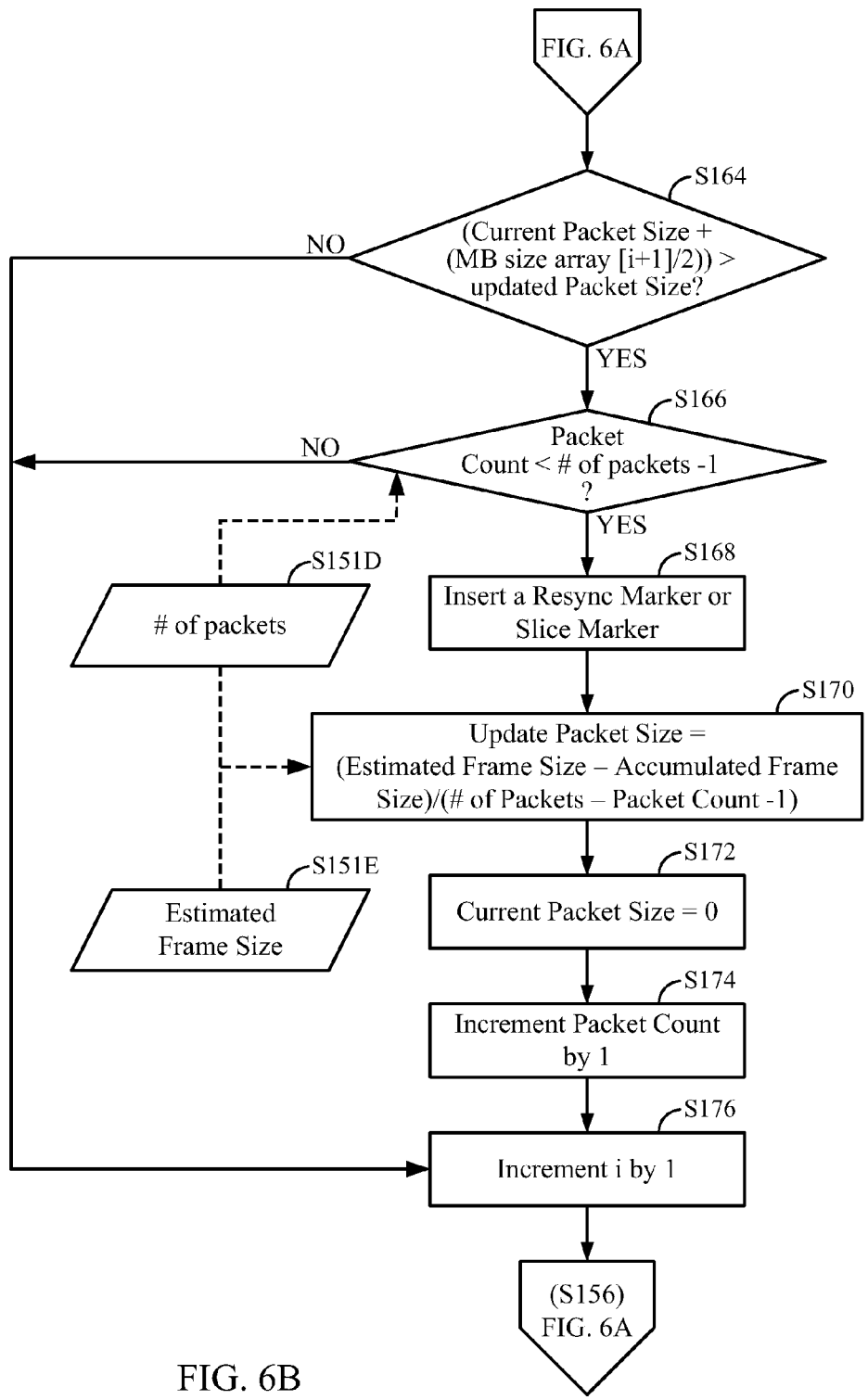

Step S170 is followed by step S172 where the current packet size is set to zero (0) and at step S174, the packet count is incremented by 1. Step S174 is followed by step S176 where the counter i is incremented. Step S176 returns to step S156 (FIG. 6A). If the determination at step S156 is "NO," (meaning no more MBs) then the process 150 ends.

Approach 2

The second approach is used when bitstream packing in Stage 1 cannot be used to estimate frame size due to limited computational power. Instead of running through bitstream packing in Stage 1, the information of the overall non-zero coefficients are used to estimate the frame size in the frame size estimator module 40B. Since the size of each MB is unknown (unlike in Approach 1), the second approach keeps track of how many non-zero coefficients (NZC) are generated for each MB and uses this information to do one MB look-ahead.

Figure 7:
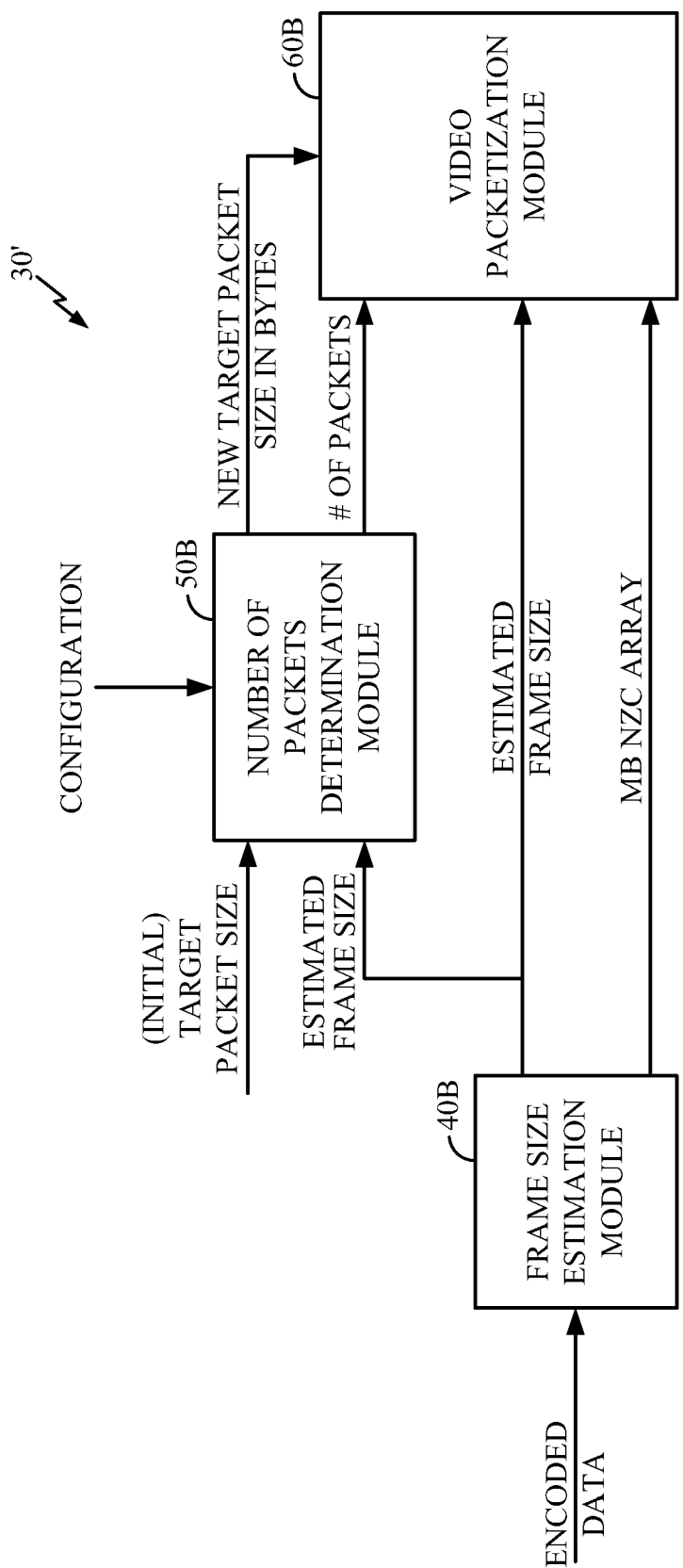
FIG. 7 illustrates a general block diagram of an alternative packet video assembler in accordance with the present invention.
Figure 14B:
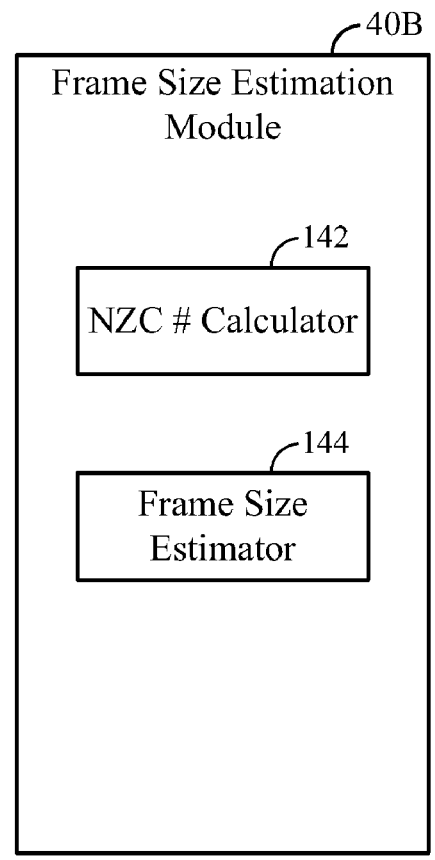
FIG. 14B illustrates a general block diagram of the frame size estimator module of FIG. 7.

Referring now to FIG. 7 and 14B, an alternate embodiment of the packet switched video assembler 30' is shown. The frame size estimation module 40B includes a NZC number calculator 142 and a frame size estimator 144. The NZC number calculator 142 keeps track of how many NZCs are generated using the encoded data from the encoding engine 16. The initial target packet size is sent to the number of packets determination module 50B. The estimated frame size is sent to the number of packets determination module 50B from the frame size estimation module 40B. Furthermore, the video packetization module 60B receives the calculated MB NCZ array from the frame size estimation module 40B. On the other hand, the number of packets determination module 50B provides the number of packets and the new target packet size in bytes to the video packetization module 60B.

Figure 8:
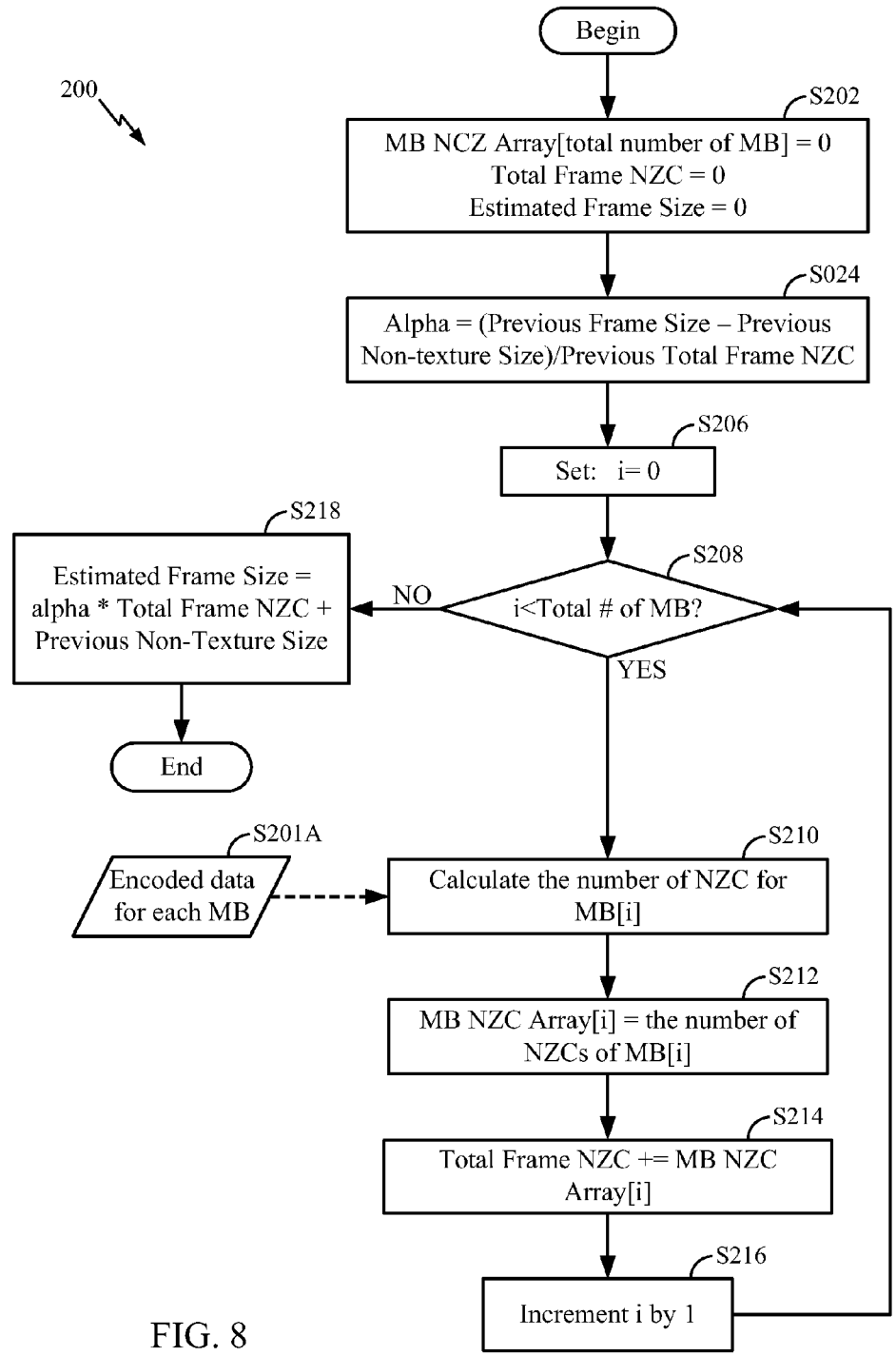
FIG. 8 illustrates a flowchart of an alternative frame size estimation (FSE) process in accordance with the present invention.

Referring now to FIGS. 8, the (Stage 1) frame size estimation (FSE) process 200 performed by the frame size estimation module 40B is shown. In the FSE process 200, it is assumed or given that the video input sequence has been encoded by the encoding engine 16. The FSE process 200 begins with an initialization step S202 where the following parameters are initialized
MB_NCZ_Array[total number of MB] to be zero
total_frame_NZC=0; and
estimated_frame_size=0;
where the total frame NZC is an accumulation of the NZCs of each MB to get the total of NZC in the frame. Basically, it is equal to adding all MB_NZC_Array[i].

Step S202 is followed by step S204 where the parameter alpha is defined by alpha=(prev_frame_size−prev_non_texture_size)/ prev_total_frame_NZC.

where prev_frame_size is the actual size generated from the previous frame, the prev_total_frame_NZC is the previous frame's total frame NZC and the prev_non_texture_size is the previous frame's non-texture size. More specifically, the value from step S214 for the current frame is first used in steps S218 and S271. Once the current frame is complete and the encoder moves to the next frame, this value from step S214 will then be used as the prev_total_frame_NZC for the next frame. The value for the prev_non_texture_size is the same as the accumulated non texture size in step S262 of FIG. 9A for the current frame once the current frame is complete. Thus, when the current frame is complete, the encoder moves to the next frame and the value from step S262 will be used for the prev_non_texture_size.

In general, alpha is the ratio of the texture bits, which are the content and the non zero coefficient (NZC) count. Alpha is used to estimate the frame size (estimated_frame_size), based on the assumption that the ratio and the non-texture bits will be the same from the previous frame. As will be seen from the description provided below, the current frame's total frame NZC will be calculated at step S214. Thus, the current frame's total frame NZC can be multiplied by alpha to form a result. The result can be added to the previous frame's non-texture bits having been accumulated previously at step S262 to estimate the frame size at step S218 (described below) for the current frame.

Step S204 is followed by step S206 where a counter i is set to zero (0). Step S204 is followed by step S208 where a determination is made whether the counter i is less than (<) the total number of MBs. If the determination is "YES," then step S208 is followed by step S210 where the number of non-zero coefficients (NZC) for MB[i] is calculated. The encoded MBs denoted at step S201A are provided from the encoding engine 16. Step S210 is followed by step S212 where MB_NZC_Array[i]=the number of NZCs of MB[i].

Step S212 is followed by step S214 where total_frame_NZC+=MB_NZC_Array[i] or total_frame_NZC=total_frame_NZC+MB_NZC_Array[i].

Step S214 is followed by step S216 where the counter i is incremented by 1 and returns to step S208 until the counter i is greater than the MBs. If the determination at step S208 is "NO," (meaning no more MBs) then step S208 is followed by step S218 where the estimated frame size is determined and is defined by estimated_frame_size=alpha*total_frame_NZC+prev_non_texture_size.

Thereafter, the FSE process 200 ends.

Figure 5:
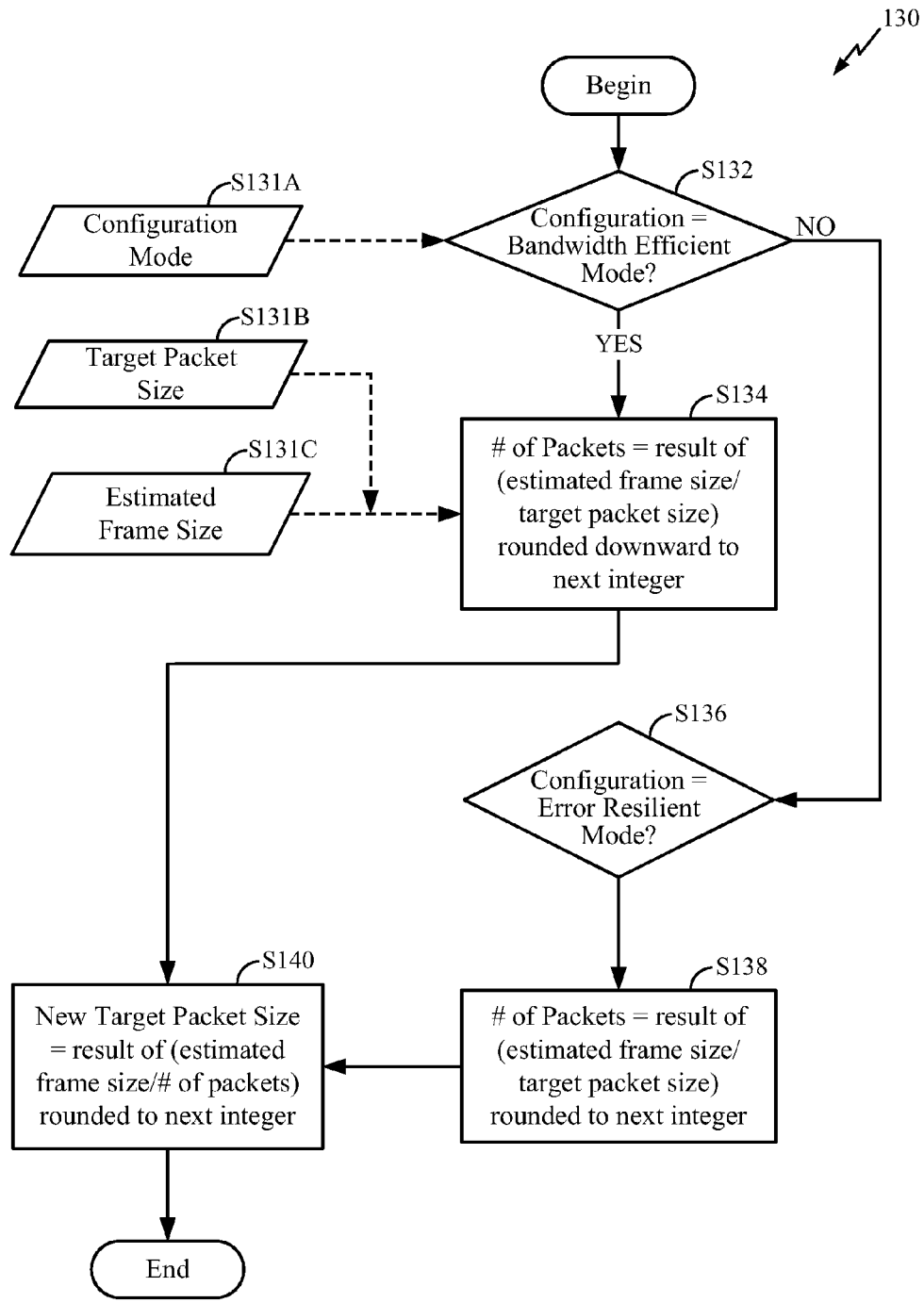
FIG. 5 illustrates a flow chart of a number of packets determination (NPD) process in accordance with the present invention.

In approach 2, the (Stage 2) number of packets determination (NPD) process is the same as the NPD process 130 set forth in FIG. 5. However, the estimated frame size is the estimated frame size calculated at step S218 of FIG. 8.

Referring now to (Stage 3) the video packetization (VP) process 250 will now be described in detail. The encoded data for each MB is provided at step S251B. The MB NZC Array at step S251C and the total frame NZC at step S251E are provided from Stage 1 (FIG. 8) or the frame size estimation module 40B. The number of packets at step S251D and the new target packet size at step S251A are provided from Stage 2 (FIG. 5) or the number of packets determination module 50B. The VP process 250 begins with step S252 where the following parameters are initialized
current_packet_size=0;
updated_packet_size=new_target_packet_size;
accumulated_frame_nzc=0;
accumulated_non_texture_size=0; and,
packet_count=0.
Step S252 is followed by step S254 where a counter i is set to zero (0). Step S254 is followed by step S256 where a determination is made whether the counter i is less (<) the number of MBs. If the determination at step S256 is "YES," then step S256 is followed by step S258 (shown in phantom) where the encoded data is packed into the bitstream. Step 258 is shown in phantom to indicate that the packing may not be performed by the packet switched video assembler 30' but in the encoding engine 16. Step S258 is followed by step S260 where the current packet size is defined by current_packet_size+=size of MB[i] from above;

and the accumulated non texture size in step S262 is defined by accumulated_non_texture_size+=size of non-texture of MB[i].

Step S262 is followed by step S264 where the accumulated frame NZC is defined by accumulated_frame_NZC+=MB NZC Array[i]

where MB NZC Array[i] is denoted at step S251C from Stage 1.

Step S264 is followed by step S266 where a determination is made whether (current_packet_size+(MB_NZC_Array[i+1]*8/2))>updated_packet_size).

where MB NZC array[i+1] is the number of the NZCs in the next MB denoted as MB[i+1]. If the determination at step S266 is "YES," then step S266 is followed by step S268 where determination is made whether (packet_count<number_of_packets-1)).

If either or both of the determinations at steps S266 and S268 are "NO," then steps S266 or S268 are followed by step S280 where the counter i is incremented by 1 and packing at step S258 of the next MB[i] into the bitstream continues unless the counter i is less (<) then the total number of MBs (meaning no more MBs).

If the determination at steps S266 and S268 are both "YES," then Step S268 is followed by step S270 where a Resynchronization Marker (RM) or Slice header is inserted. Step S270 is followed by step S272 where the remaining frame size is calculated and is defined by remaining_frame_size=alpha*(total_frame_NZC-accumulated_frame_NZC)+max(prev_non_texture_size-accumulated_non_texture_size), 0));

where the accumulated_non_texture_size is a count of how many bytes have been generated on non-texture part and updated accordingly. Sometimes the accumulated non-texture size may be larger than the previous frame's non-texture count (prev_non_texture_size). The subtraction of the accumulated non-texture size from the previous frame's non-texture count or size yields a negative result. When this condition happens, the result is set to zero (0) such as by using a max operation.

Figure 9A:
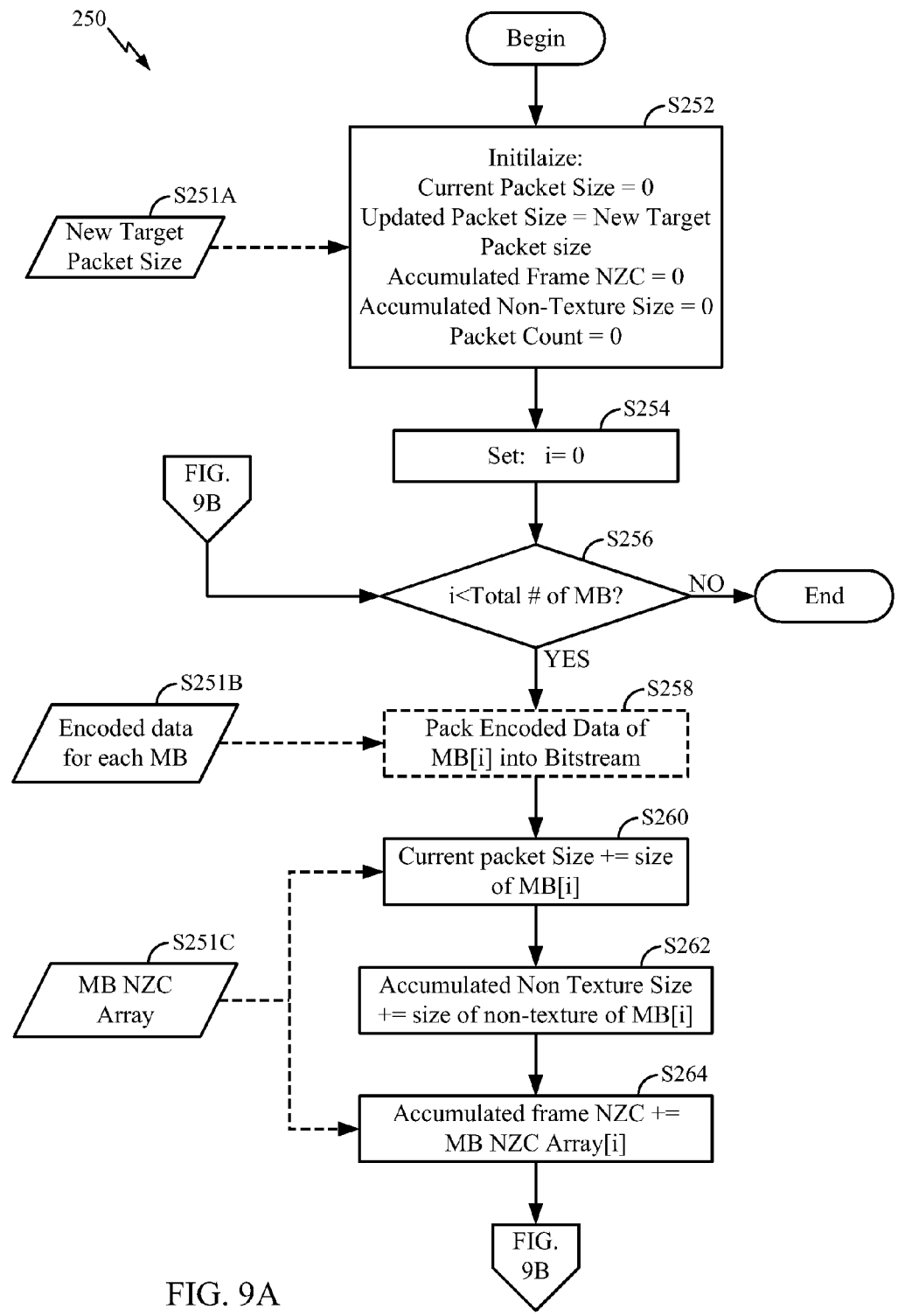
FIGS. 9A-9B illustrate a flowchart of an alternative video packetization (VP) process in accordance with the present invention.
Figure 9B:
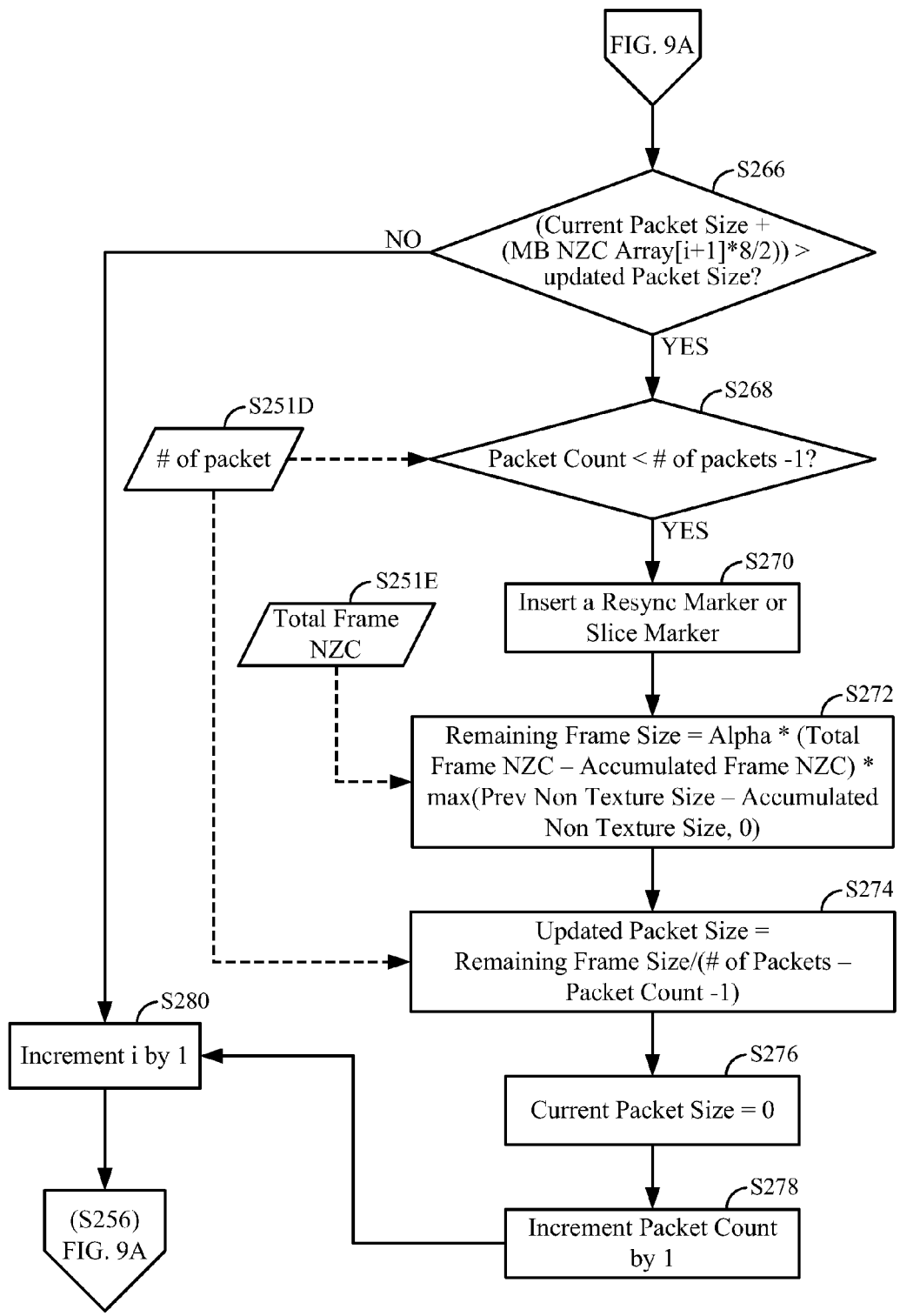

Step S272 is followed by step S274 where the updated packet size is calculated and is defined by updated_packet_size=remaining_frame_size/(number_of_packets-packet_count-1);

Step S274 is followed by step S276 where the current packet size is set to zero (0) and, at step S278, the packet count is incremented by 1. Step S278 is followed by step S280 where the counter i is incremented. Step S280 returns to step S256 (FIG. 9A). If the determination at step S256 is "NO," (meaning no more MBs) then the process 250 ends. Otherwise, the process beginning with packing the encoded data at step S258 is repeated Approach 3

The third approach performs the video packetization during the encoding process by the encoding engine. Therefore, the third approach needs to decide where to make a video packet on-the-fly in the middle of the encoding process. The third approach is particularly suitable when bitstream packing has to be done together with the encoding process. Also, it can be used with for H.263 and H.264 formats when a slice has to be made but intra-prediction has to be turned off.

In (Stage 1) the FSE process 300, the number of non-zero coefficients (NZC) is not known in advance as in Approach 2. Thus, the FSE process 300 relies on a "desired total NZC" before the encoding starts. Also, since the NZC of each MB is unknown in advance, the look-ahead is turned off.

Figure 10:
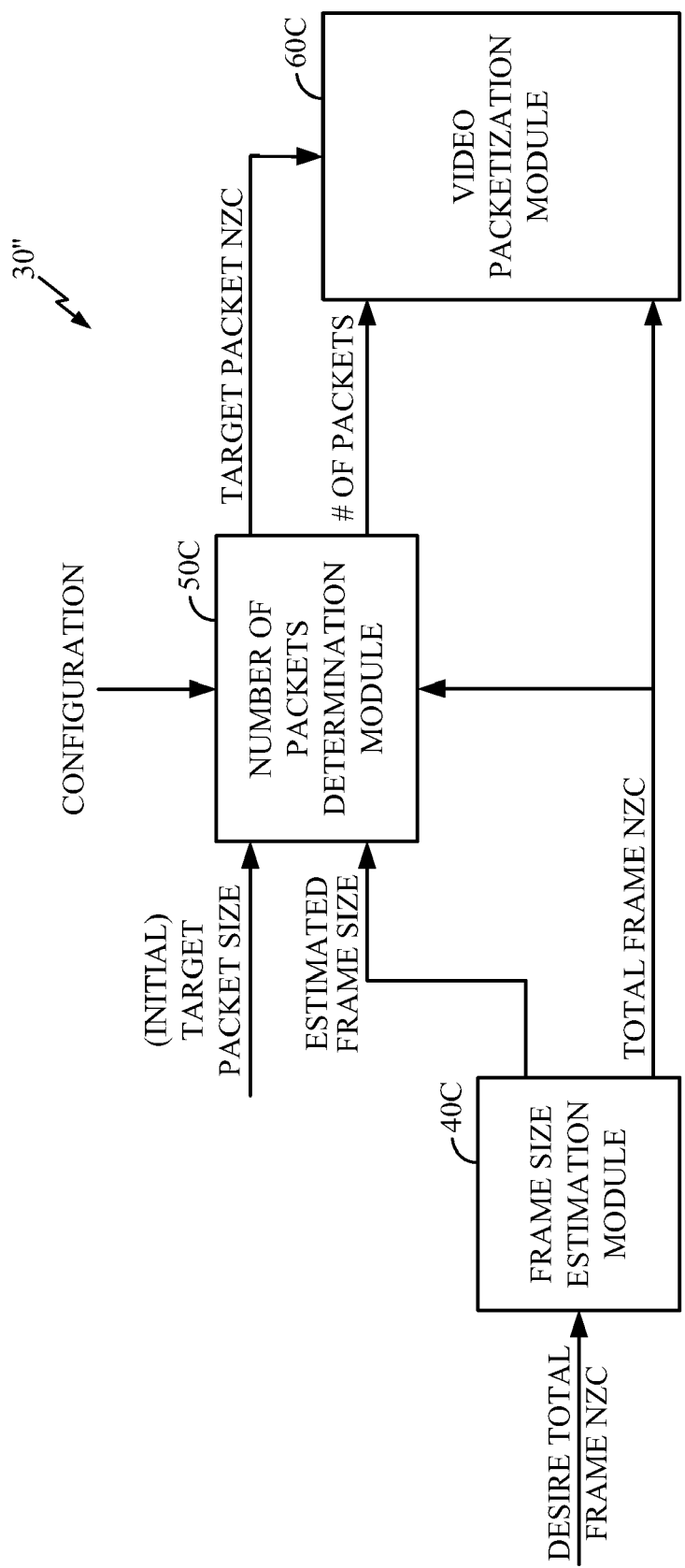
FIG. 10 illustrates a general block diagram of a still further alternative packet video assembler in accordance with the present invention.

In FIG. 10, an alternate embodiment of the packet video assembler 30" is shown. The frame size estimation module 40C receives the desired total frame NZC provided by a rate controller (NOT SHOWN) in the encoding engine 16, the rate controller decides the frame size before the frame is encoded. The frame size is then converted to desired frame NZC. Initially, this desired frame NZC is used to guide the encoding process to generate a frame of the same NZC. We further use that information in this invention.) The frame size estimation module 40C determines the estimated frame size which is sent to the number of packets determination module 50C. The frame size estimation module 40C also determines the total frame NZC which is sent to both the number of packets determination module 50C and the video packetization module 60C. The number of packets determination module 50C receives the initial target packet size and outputs the target packet NZC and the number of packets to the video packetization module 60C.

Figure 11:
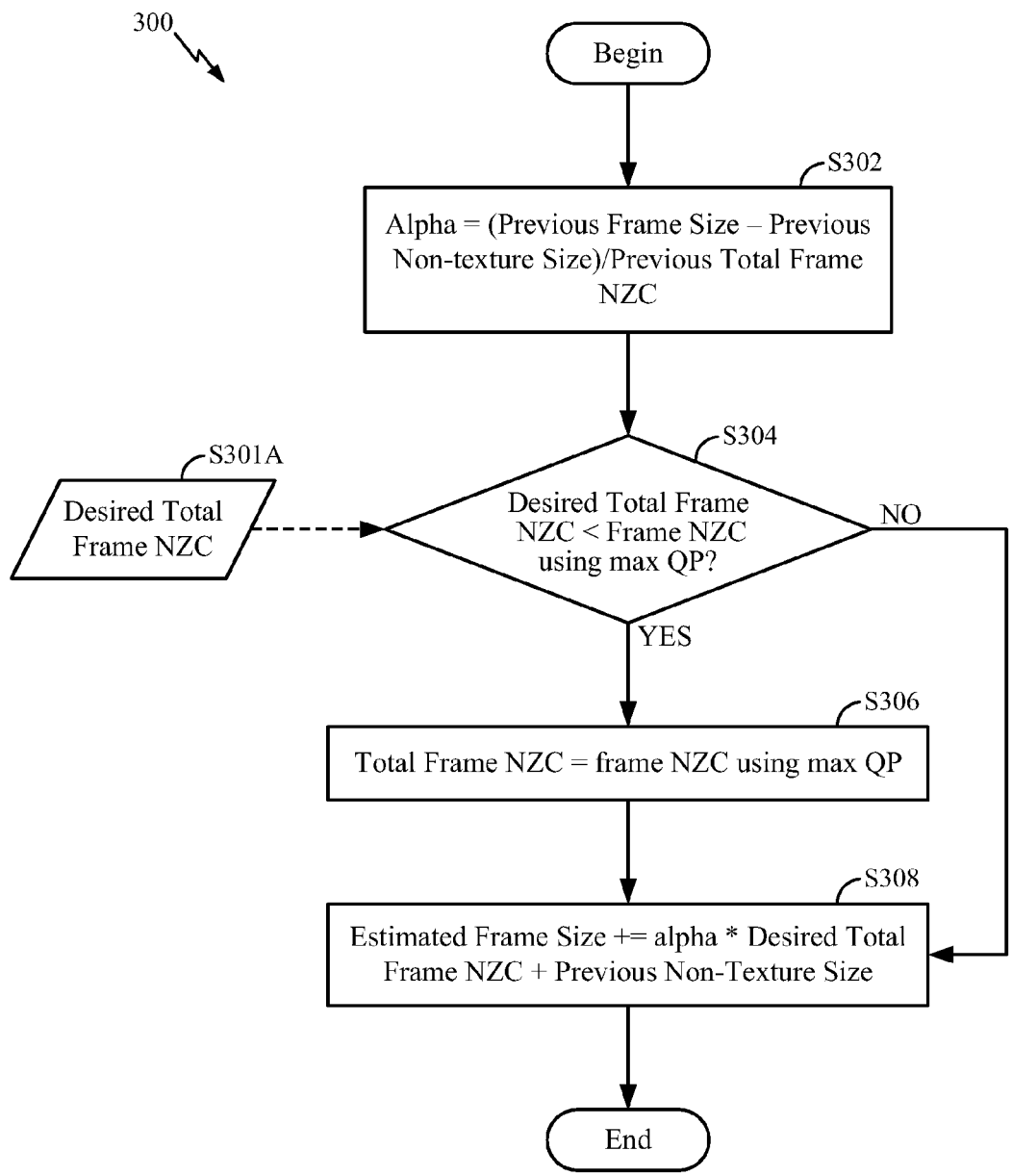
FIG. 11 illustrates a flowchart of a still further alternative frame size estimation (FSE) process in accordance with the present invention.

Referring now to FIG. 11, the (Stage 1) frame size estimation (FSE) process 300 will now be described. The parameter desired total frame NZC is provided at step S301A. The FSE process 300 begins with step S302 where alpha is calculated as alpha=(prev_frame_size−prev_non_texture_size)/ prev_total_frame_NZC where prev_frame size, prev_non_texture_size, prev_total_ frame_NZC were determined for the previous frame. The parameter alpha was previously described. Step S302 is followed by step S304 where a determination is made whether desired_total_frame_NZC<frame_NZC using max QP where QP is the quantization parameters or quantization step-size of the MB.

It should be noted that the desired total frame NZC is a target to guide the encoding process in the encoding engine 16. In order to generate the desired total frame NZC, the quantization parameters (QP) for each MB may be varied. However, there are situations where even when the maximum allowed QP (such as 31 in MPEG4 and H263, and 52 in H264 video coding standards) is used, the desired total frame NZC still cannot be met. Instead, more NZCs will be had. In such a case, the QP used for each MB will be the maximum. As a result, the desired total frame NZC is not used. Instead, the total frame NZC using the max allowed QP in a coding standard is used. This information is usually available by doing frame analysis.

Returning again to step S304, if the determination at step S304 is "YES," then step S304 is followed by step S306 where the total frame NZC is calculated as total_frame_nzc=frame_nzc using max QP.

Step S306 is followed by step S308 where the estimated frame size is calculated based on estimated_frame_size=alpha*desired_total_frame_nzc+prev_ non_texture_size.

Returning again to step S304, if the determination at step S304 is "NO," then step S304 is followed by step S308 where the estimated frame size is calculated. After step S308, the process 300 ends.

Figure 15B:
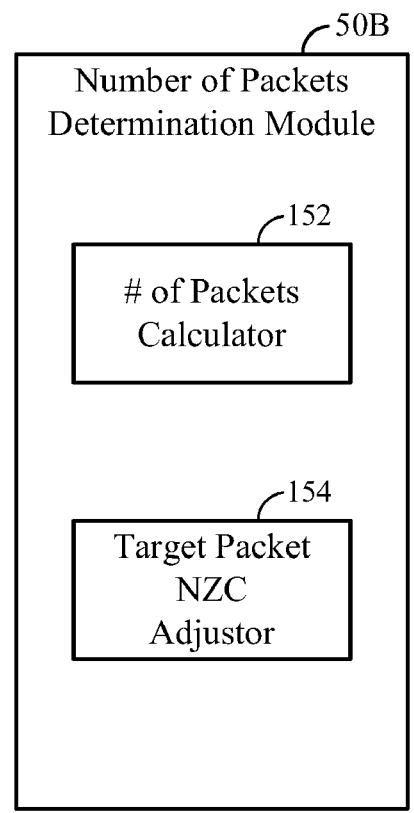
FIG. 15B illustrates a general block diagram of the number of packets determination module of FIG. 10.
Figure 16:
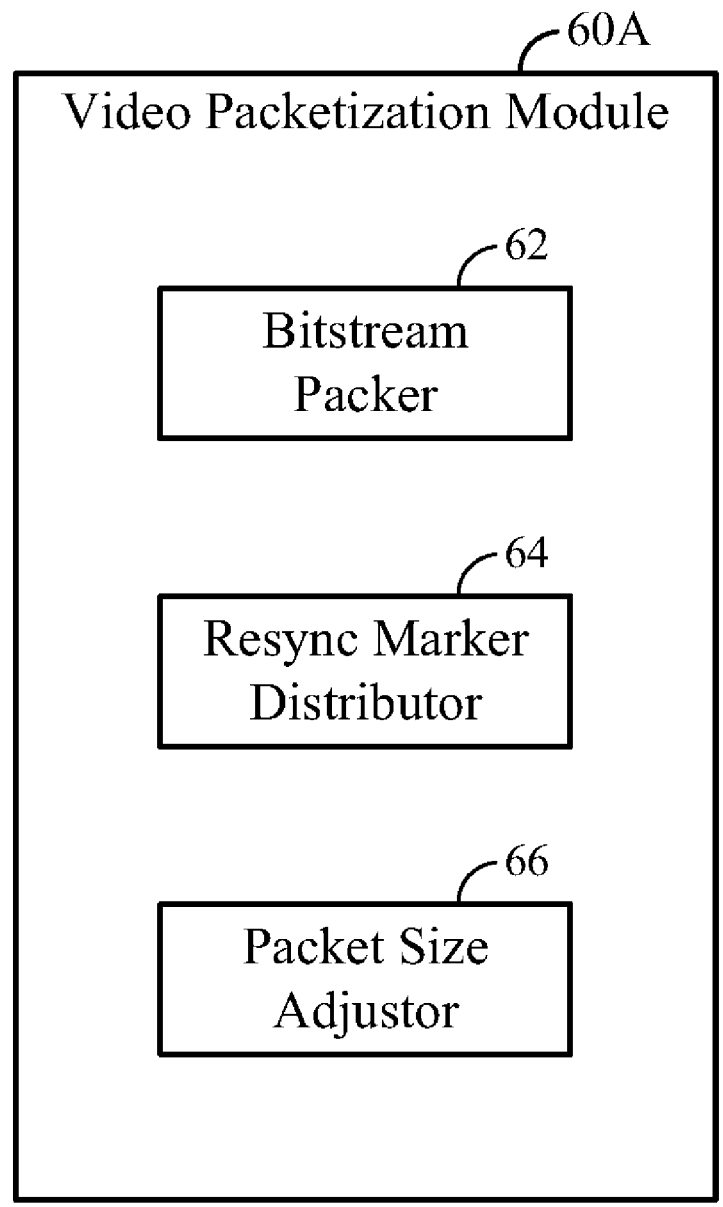
FIG. 16 illustrates a general block diagram of the video packetization module of FIG. 3.

The (Stage 2) number of packets determination (NPD) process 330 performed by the number of packets determination module 50C (FIG. 15B) is shown. The target packet size in bytes represented at step S331B is given and the estimated frame size represented at step S331C was calculated in Stage 1 at step S308. The configuration represented at step S331A is set by the configuration mode. The configuration includes a bandwidth efficient mode and an error resilient mode. The NPD process 330 begins with step S332 where a determination is made whether the configuration=bandwidth efficient mode. If the determination at step S332 is "YES," then step S332 is followed by step S334 where the number of packets is defined by number_of_packets=FLOOR(estimated_frame_size/ target_packet_size)

where the FLOOR function is the same as rounding the result of the operation ( ) downward to the next integer. Step S334 is followed by step S340 where the target packet NZC is calculated by the target packet NZC adjustor 154 and is defined by target_packet_NZC=ROUND(total_frame_NZC/ number_of_packets);

where the ROUND function is the rounds the result of the operation ( ).

On the other hand, if the determination at step S332 is "NO," step S332 is followed by step S336 where a determination is made whether the configuration is set to the error resilient mode. If at step S336 the determination is "YES," the step S336 is followed by step S338 where the number of packets is calculated by the number of packets calculator 152 and is defined by number_of_packets=ROUND(estimated_frame_size/ target_packet_size).

Step S338 is followed by step S340 where the target packet NZC is calculated as previously described. Thereafter, the NPD process 330 ends.

Figure 12:
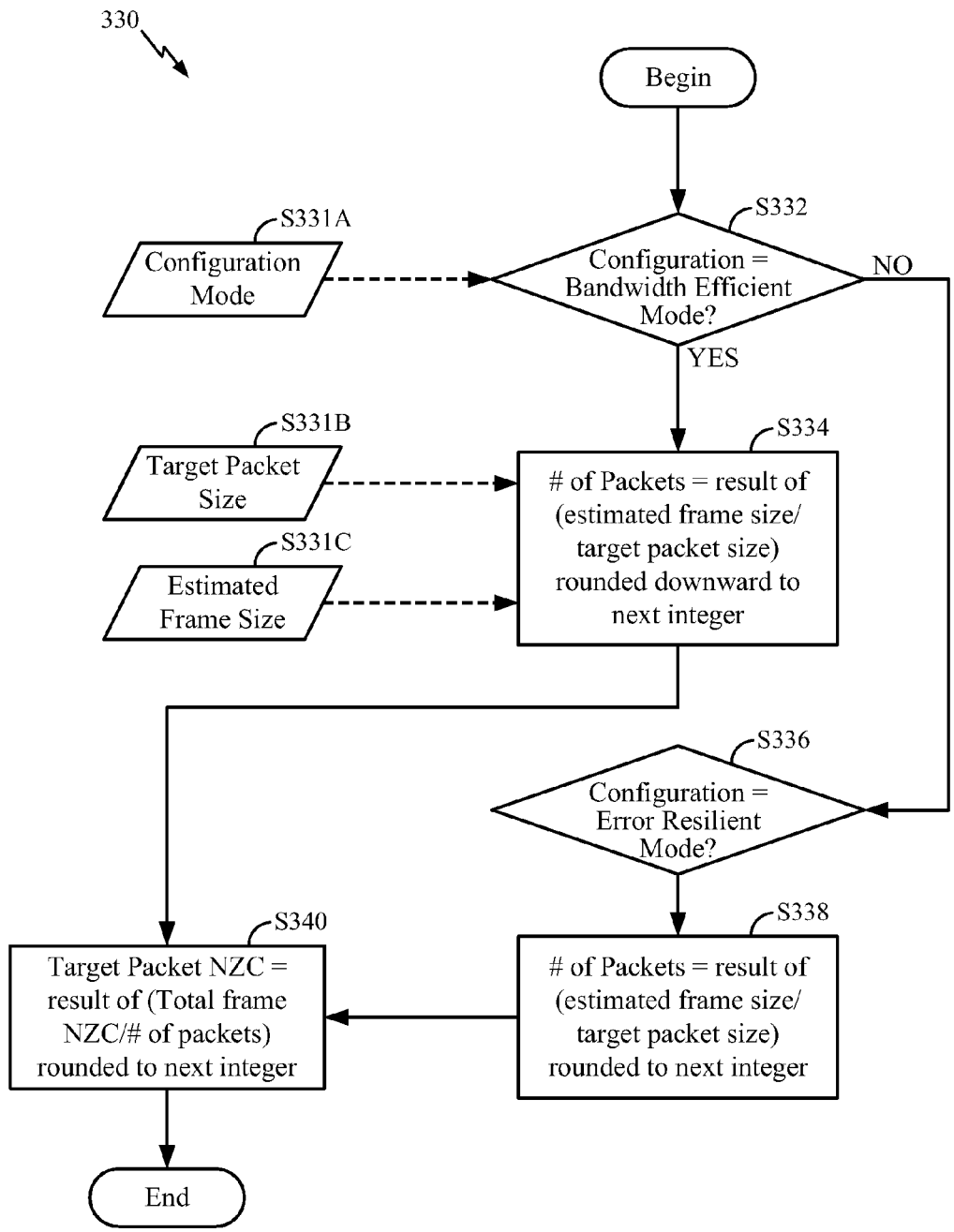
FIG. 12 illustrates a flow chart of an alternative number of packets determination (NPD) process in accordance with the present invention.
Figure 13A:
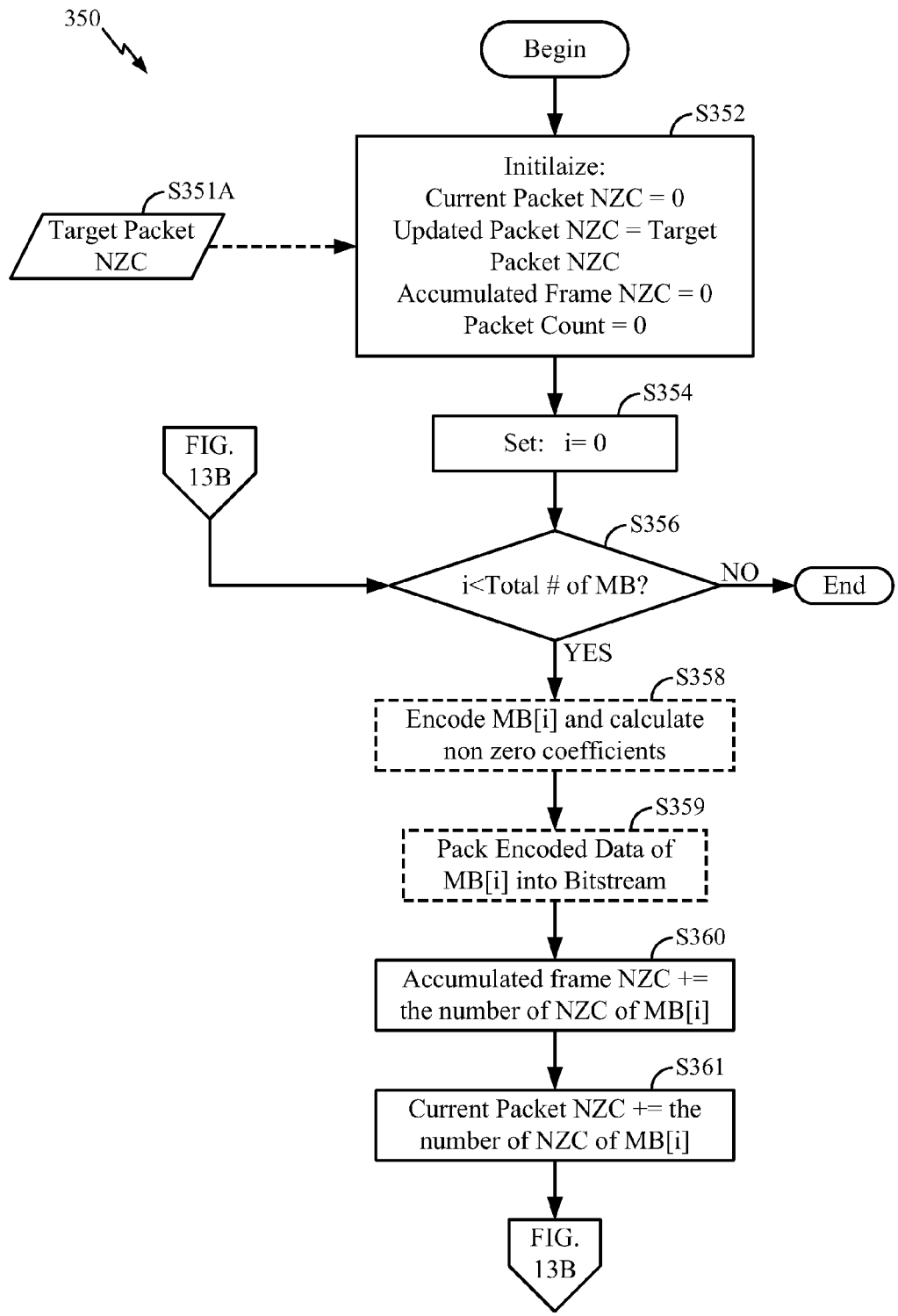
FIGS. 13A-13B illustrate a flowchart of a still further alternative video packetization (VP) process in accordance with the present invention.
Figure 13B:
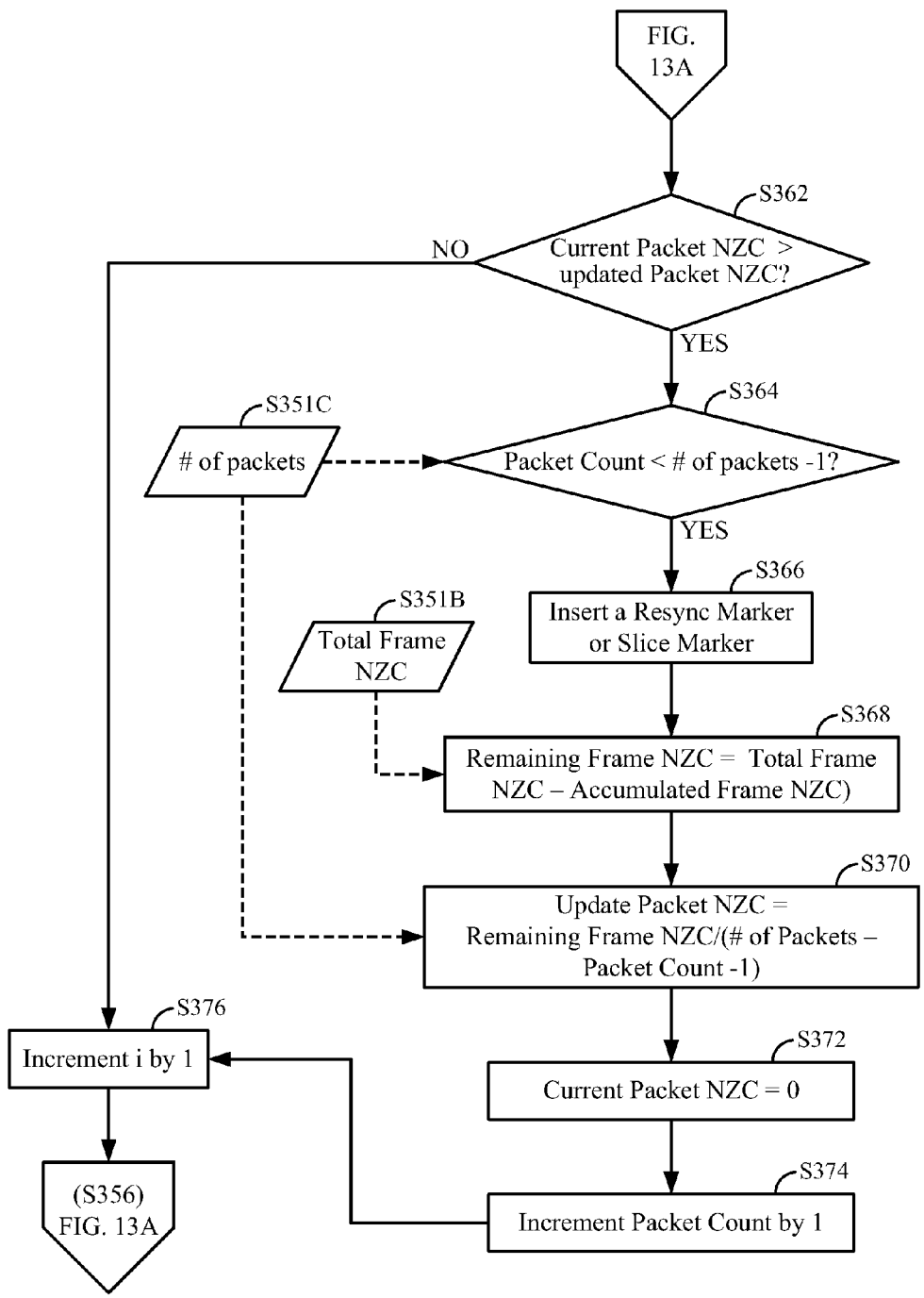

Referring now to FIGS. 13A and 13B, the (Stage 3) video packetization (VP) process 350 will now be described in detail. The total frame NZC 351B is provided from Stage 1 (FIG. 11) or the frame size estimation module 40C. The number of packets at step S351C and the target packet NZC at step S351A are provide from Stage 2 (FIG. 12) or the number of packets determination module 50C. The VP process 350 begins with step S352 where the following parameters are initialized
current_packet_NZC=0;
updated_packet_NZC=target_packet_NZC;
accumulated_frame_NZC=0; and,
packet_count=0.

Step S352 is followed by step S354 where a counter i is set to zero (0). Step S354 is followed by step S356 where a determination is made whether the counter i is less than (<) the number of MBs. If the determination at step S356 is "YES," then step S356 is followed by step S358 (shown in phantom) where MB[i] is encoded by the encoding engine 16 and the number of non-zero coefficients (NZC) are calculated. Step S358 is followed by step S359 (shown in phantom) where the encoded data for MB[i] is packed into the bitstream by the encoding engine 16. Steps 358 and 359 are shown in phantom to indicate that the encoding and packing may not performed by the packet switched video assembler 30" but in the encoding engine 16. Step S359 is followed by step S360 where the accumulated frame NZC is defined by accumulated_frame_NZC+=the number of NZCs of MB[i] or accumulated_frame_NZC+=accumulated_frame_ NZC+the number of NZCs of MB[i].

Step S360 is followed by step S361 where the current packet NZC is calculated by current_packet_NZC+=the number of NZCs of MB[i] or current_packet_NZC+=current_packet_NZC+the number of NZCs of MB[i].

Step 361 is followed by step S362 where a determination is made whether (current_packet_NZC>updated_packet_NZC).

If the determination at step S362 is "YES," then step S362 is followed by step S364 where a determination is made whether (packet_count<number_of_packets−1)).

If either or both of the determinations at steps S362 and S364 are "NO," then step S362 or S364 is followed by step S376 where the counter i is incremented by 1 and the process returns to step S356 where the encoding, at step S358, of the next MB[i] continues, as well as the calculation of the NZC coefficients, unless the counter i is less (<) then the total number of MBs (meaning no more MBs).

If the determination at steps S362 and S364 are both "YES," then Step S364 is followed by step S366 where a Resynchronization Marker (RM) or Slice header is inserted. Step S366 is followed by step S368 where the remaining frame NZC is calculated and is defined by remaining_frame_size=frame_NZC−accumulated_frame_NZC.

Step S368 is followed by step S370 where the updated packet NZC is calculated and is defined by updated_packet_NZC=remaining_frame_NZC/(number_of_packets−packet_count−1).

Step S370 is followed by step S372 where the current packet NZC is set to zero (0) and at step S374, the packet count is incremented by 1. Step S374 is followed by step S376 where the counter i is incremented. Step S376 returns to step S356 (FIG. 13A). If the determination at step S356 is "NO," (meaning no more MBs) then the process 350 ends.

Simulation Results

Figure 17A:
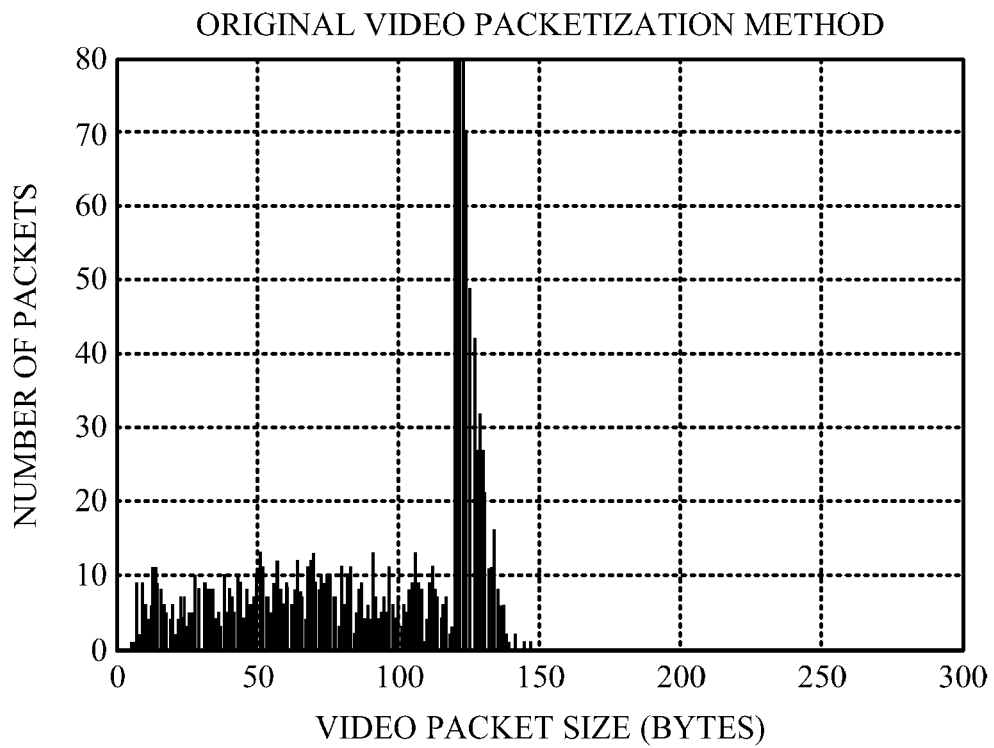
FIG. 17A illustrates a graph of the video packet size in bytes verses the number of packets for the original packetization approach using a Carphone sequence and a target packet size of 120 bytes.
Figure 17B:
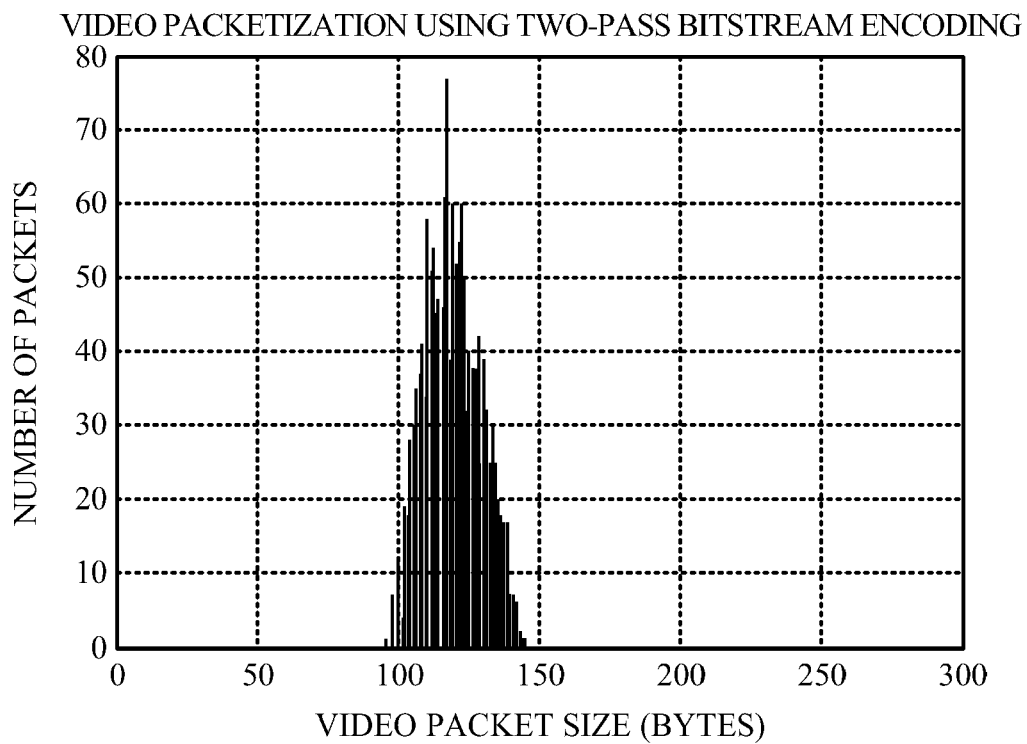
FIG. 17B illustrates a graph of the video packet size in bytes verses the number of packets using a Carphone sequence in the embodiment of FIG. 3.
Figure 17C:
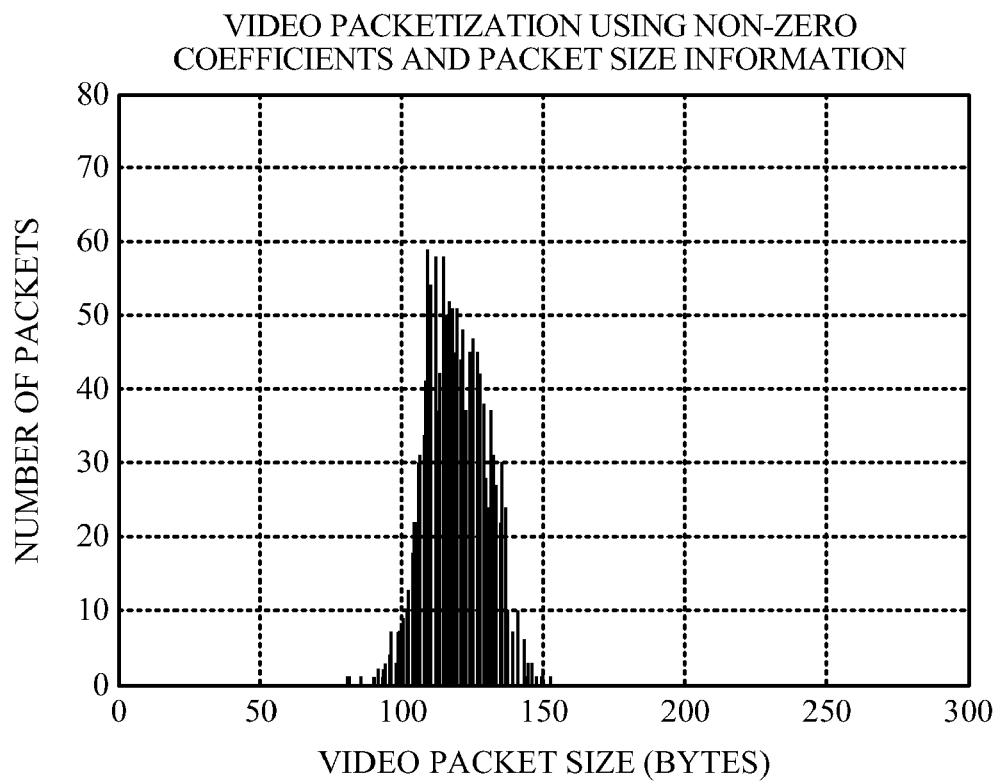
FIG. 17C illustrates a graph of the video packet size in bytes verses the number of packets using a Carphone sequence in the embodiment of FIG. 7.
Figure 17D:
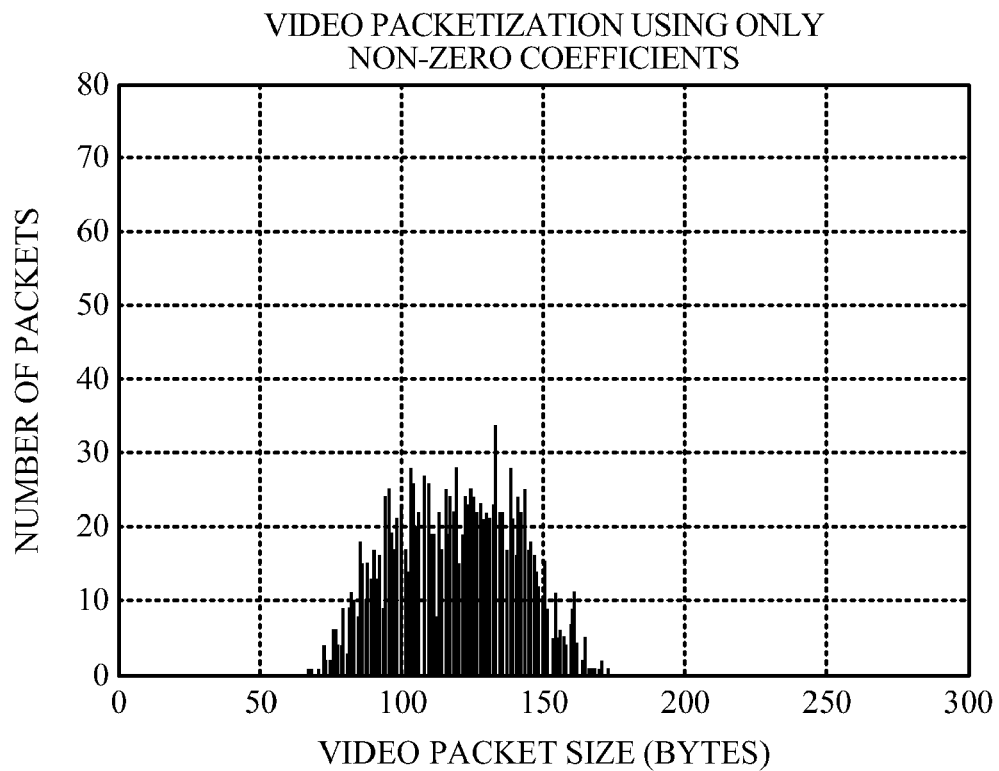
FIG. 17D illustrates a graph of the video packet size in bytes verses the number of packets using a Carphone sequence in the embodiment of FIG. 10.

The graphs in FIGS. 17A-17D illustrate the simulation results using a Carphone sequence with the original approach (FIG. 17A), the Approach 1 (FIG. 17B), Approach 2 (FIG. 17C), and Approach 3 (FIG. 17D). The simulation results illustrate the effectiveness of Approaches 1, 2 and 3. The original approach makes a video packet when the packet size exceeds the pre-defined packet size. The simulation results shows that many small packets are generated. Some of the small packets have a size of less than 10 bytes. Thus, bandwidth is greatly wasted.

With Approach 1, the packet sizes in the simulation results are mostly around 120 bytes. The variation is between 100 bytes to 150 bytes. This is because the frame size is usually not a multiple of 120 bytes. For example, when the frame size is 400 bytes, it is better to have 3 133-byte packets instead of 3 120-byte packets and one 40 bytes packet. Protecting the remaining 40 bytes with 40-byte overhead does not make much sense.

With Approach 2, since the frame size is estimated using NZC, it is not as accurate as in Approach 1. However, the accuracy is still decent enough so that the packet size distribution is very similar to Approach 1. Moreover, with Approach 2, the computation complexity is reduced while providing bandwidth efficient packetization. For Approach 3, the distribution is wider as the video packetization cannot be done by calculating the packet size. The decision is done on the NCZ domain. However, even with Approach 3, the creation of small packets is reduced when compared to the original approach.

Table 1 is set forth below of the simulation results showing the number of packets generated for each approach.

TABLE 1

| | Conventional | Approach 1 | Approach 2 | Approach 3 | Gain |
|---|---|---|---|---|---|
| Carphone | 1834 | 1488 | 1498 | 1499 | 19% |

It will be appreciated by those of ordinary skill in the art that the three-stage process and device described herein reduce the number of packets and improve bandwidth utilization. Furthermore, the three-stage process divides the video frames into (roughly) equally sized packets and dynamically updates the packet size.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

APPENDIX

```
Pseudo Code Approach 1
Stage 1: Frame Size Estimation
    Given:
        Target_Packet_Size in bytes
        Encoded data for each MB such as motion vectors and quantized
        coefficients
    Initialize:
        MB_Size_Array[total number of MB] to be zero
        current_packet_size = 0;
        estimated_frame_size = 0;
    Frame Size Estimation Algorithm:
        For (i=0; i<total number of MB; i++)
        {
            Pack the encoded data of MB[i] into bitstream
            MB_Size_Array[i] = the size of the bitstream of MB[i]
            current_packet_size += MB_Size_Array[i];
            estimated_frame_size += MB_Size_Array[i];
            If (the current slice size >= Target_Packet_Size)
            {
                Insert a Resynchronization Marker or Slice header;
                current_packet_size = 0;
            }
        }
Stage 2: Number of Packets Determination
    Given:
        Target_Packet_Size in bytes
        estimated_frame_size from Step 1
        configuration (bandwidth efficient or error resilient mode)
    Number of Packet Determination Algorithm:
        If (configuration == bandwidth efficient mode)
        {
            number_of_packet =
                FLOOR(estimated_frame_size / target_packet_size);
        }
        Else if (configuration == error resilient mode)
        {
            number_of_packet =
                ROUND(estimated_frame_size / target_packet_size);
        }
        new_target_packet_size =
            ROUND(estimated_frame_size / number_of_packet);
Stage 3: Video Packetization
    Given:
        Encoded data for each MB
        estimated_frame_size from Step 1
        MB_Size_Array     from Step 1
        number_of_packet  from Step 2
```

APPENDIX-continued

```
        new_target_packet_size from Step 2
    Initialize:
        current_packet_size = 0;
        updated_packet_size = new_target_packet_size;
        accumulated_frame_size = 0;
        packet_count = 0;
    Video Packetization Algorithm:
        For (i=0; i<total number of MB; i++)
        {
            Pack the encoded data of MB[i] into bitstream
            current_packet_size += size of MB[i] from above;
            accumulated_frame_size += MB_Size_Array[i];
            (NOTE:from Step 1)
            If ((current_packet_size + (MB_Size_Array[i+1]/2)) >
                    updated_packet_size) &&
                (packet_count < number_of_packet -1))
            {
                Insert a Resynchronization Marker or Slice header;
                updated_packet_size =(estimated_frame_size -
                                accumulated_frame_size) /
                                (number_of_packet - packet_count - 1);
                current_packet_size = 0;
                packet_count += 1;
            }
Pseudo Code Approach 2
Stage 1: Frame Size Estimation
    Given:
        Encoded data for each MB
    Initialize:
        MB_NCZ_Array[total number of MB] to be zero
        total_frame_NZC = 0;
        estimated_frame_size = 0;
        alpha =
        (prev_frame_size - prev_non_texture_size)/
            prev_total_frame_NZC;
    Frame Size Estimation Algorithm:
        For (i=0; i<total number of MB; i++)
        {
            Calculate the number of non-zero coefficient for MB[i];
            MB_NZC_Array[i] = the NZC of MB[i];
            total_frame_NZC += MB_NZC_Array[i];
        }
        estimated_frame_size
            = alpha*total_frame_NZC + prev_non_texture_size;
Stage 2: Number of Packet Determination
    Given:
        target_packet_size in bytes
        estimated_frame_size from Step 1
        configuration (bandwidth efficient or error resilient mode)
    Number of Packet Determination Algorithm:
        If (configuration == bandwidth efficient mode)
        {
            number_of_packet =
                FLOOR(estimated_frame_size / target_packet_size);
        }
        Else if (configuration == error resilient mode)
        {
            number_of_packet =
                ROUND(estimated_frame_size / target_packet_size);
        }
        new_target_packet_size =
            ROUND(estimated_frame_size / number_of_packet);
Stage 3: Video Packetization
    Given:
        Encoded data for each MB
        MB_NZC_Array      from Step 1
        total_frame_nzc   from Step 1
        number_of_packet  from Step 2
        new_target_packet_size from Step 2
    Initialize:
        current_packet_size = 0;
        updated_packet_size = new_target_packet_size;
        accumulated_frame_nzc = 0;
        accumulated_non_texture_size = 0;
        packet_count = 0;
    Video Packetization Algorithm:
        For (i=0; i<total number of MB; i++)
        {
            Pack the encoded data of MB[i] into bitstream
            current_packet_size += size of MB[i] from above;
            accumulated_non_texture_size += size of non-texture of MB[i];
            accumulated_frame_NZC += MB_NZC_Array[i];
            If ((current_packet_size + (MB_NZC_Array[i+1]*8/2)) >
                    updated_packet_size) &&
                (packet_count < number_of_packet -1))
            {
                Insert a Resynchronization Marker or Slice header;
                remaining_frame_size =
                    alpha*(total_frame_nzc- accumulated_frame_NZC) +
                    max(prev_non_texture_size -
                        accumulated_non_texture_size), 0));
                updated_packet_size = remaining_frame_size /
                                (number_of_packet - packet_count - 1);
                current_packet_size = 0;
                packet_count += 1;
            }
        }
Pseudo Code Approach 3
Stage 1: Frame Size Estimation
    Given:
        desired_total_frame_nzc
    Initialize:
        alpha =
        (prev_frame_size - prev_non_texture_size)/
            prev_total_frame_NZC;
    Frame Size Estimation Algorithm:
        If (desired_total_frame_nzc < frame_nzc using max QP)
        {
            total_frame_nzc = frame_nzc using max QP;
        }
        estimated_frame_size = alpha* desired_total_frame_nzc +
                        prev_non_texture_size;
Stage 2: Number of Packet Determination
    Given:
        target_packet_size in bytes
        estimated_frame_size from Step 1
        total_frame_nzc    from Step 1
        configuration (bandwidth efficient or error resilient mode)
    Number of Packet Determination Algorithm:
        If (configuration == bandwidth efficient mode)
        {
            number_of_packet =
                FLOOR(estimated_frame_size / target_packet_size);
        }
        Else if (configuration == error resilient mode)
        {
            number_of_packet =
                ROUND(estimated_frame_size / target_packet_size);
        }
        target_packet_nzc = ROUND(total_frame_nzc /
            number_of_packet);
Stage 3: Video Packetization
    Given:
        Encoded data for each MB
        total_frame_nzc     from Step 1
        number_of_packet    from Step 2
        target packet_nzc   from Step 2
    Initialize:
        updated_packet_nzc = target_packet_nzc;
        current_packet_nzc = 0;
        accumulated_frame_nzc = 0;
        packet_count = 0;
    Video Packetization Algorithm:
        For (i=0; i<total number of MB; i++)
        {
            Encode MB[i] and calculate number of non-zero coefficients;
            Pack the encoded data of MB[i] into bitstream;
            accumulated_frame_NZC += number of nzc of MB[i] from
                above;
            current_packet_nzc += number of nzc of MB[i] ;
            If ((current_packet_nzc > updated_packet_nzc) &&
                (packet_count < number_of_packet -1))
            {
                Insert a Resynchronization Marker or Slice header;
                remaining_frame_nzc = total_frame_nzc -
                    accumulated_frame_NZC;
                updated_packet_nzc = remaining_frame_nzc /
                        (number_of_packet - packet_count - 1);
                current_packet_nzc = 0;
                packet_count += 1;
```

APPENDIX-continued

```
    }
  }
```

What is claimed:

1. A packet-switched video telephony device comprising:
an encoder operable to encode a video sequence to create an encoded video data;
a packet switched video assembler operable to packetize the encoded video data into dynamically adjusted packets by estimating a size of a frame of the video sequence to determine an estimated frame size, estimating a number of packets to be generated for the frame based on the estimated frame size and iteratively calculating an updated packet size, based on at least the estimated frame size and the number of packets, on a packet-by-packet basis, while the encoded video data is packed into an actual bitstream; and
a transmitter for transmitting the actual bitstream.

2. The device of claim 1, wherein the packet switched video assembler is operable to determine the number of packets based on a configuration mode, the estimated frame size and an initial fixed target packet size, and calculate a new target packet size based on the number of packets and the estimated frame size.

3. The device of claim 2, wherein the packet switched video assembler is operable to estimate the estimated frame size by packing the encoded data into a simulation bitstream.

4. The device of claim 3, wherein the packet switched video assembler is operable to estimate the size of the frame to determine the estimated frame size by inserting a simulation resynchronization marker or simulation slice header in the simulation bitstream.

5. The device of claim 4, wherein the packet switched video assembler is operable to pack a current macroblock of the encoded data into the actual bitstream, look ahead one macroblock in the encoded video data, evaluate whether a result of a count representative of a size of the current packet size plus a predetermined portion of a count representative of a size of the one macroblock exceeds the updated packet size and, when the result exceeds the updated packet size and a packet count is less than the number of packets, insert an actual resynchronization marker or an actual slice header before the one macroblock and recalculate the updated packet size.

6. The device of claim 2, wherein the packet switched video assembler is operable to estimate the size of the frame to determine the estimated frame size by calculating a number of non-zero coefficients (NZCs) for a current macroblock of the encoded video data and accumulating the number of NZCs for each macroblock in the frame to form a total frame NZC.

7. The device of claim 6, wherein the packet switched video assembler is operable to estimate the size of the frame to determine the estimated frame size based on the following:

estimated frame size=alpha*total frame NZC+previous non-texture size where alpha is defined by alpha=(previous frame size−previous non-texture size)/previous total frame NZC and where the previous non-texture size is a count representative of non-texture bits in a previous frame, the previous frame size is an actual frame size of the previous frame and the previous total frame NZC is the total frame NZC of the previous frame.

8. The device of claim 7, wherein the packet switched video assembler is operable to, after packing of a current macroblock of the encoded data into the actual bitstream, look ahead one macroblock, evaluate whether a result of a count representative of a current packet size plus a count of the NZCs in the one macroblock multiplied by a predetermined factor is greater than the updated packet size and, when the result exceeds the updated packet size and a packet count is less than the number of packets, insert an actual resynchronization marker or an actual slice header before the one macroblock and recalculate the updated packet size.

9. The device of claim 1, wherein the packet switched video assembler is operable to estimate the size of the frame to determine the estimated frame size based on the following:

estimated_frame_size=alpha*desired total frame NZC+previous non-texture size where alpha=previous frame size−previous non-texture size)/previous total frame NZC and where the previous non-texture size is a count representative of non-texture bits in a previous frame, the previous frame size is an actual frame size of the previous frame, the previous total frame NZC is a count representative of an accumulation of a previous frame's total non-zero coefficients (NZC) and the desired total frame NZC is an initial fixed value identifying a frame's total non-zero coefficients (NZC).

10. The device of claim 9, wherein the packet switched video assembler is operable to calculate a total frame NZC value representative of a frame's total number of non-zero coefficients (NZC) for a maximum quantization parameter and calculate a target packet NZC value representative of a target packet's number of non-zero coefficients (NZC) based on a rounded result of the total frame NZC value divided by the number of packets, the number of packets being a function of a configuration mode.

11. The device of claim 10, wherein the packet switched video assembler is operable to, after encoding a current macroblock, calculate a number of non-zero coefficients (NZC) for the current macroblock and packing the current macroblock into the actual bitstream, evaluate whether a count representative of a current packet's non-zero coefficients (NZC) is greater than an updated packet NZC value and, when the result exceeds the updated packet NZC value and a packet count is less than the number of packets, insert a resynchronization marker or a slice header before a next macroblock and recalculate the updated packet NZC value.

12. A non-transitory computer-readable medium comprising program instructions that, when executed, cause one or more processors to:
encode a video sequence to create an encoded video data;
estimate a size of a frame of the video sequence to determine an estimated frame size, estimate a number of packets to be generated for a frame based on the estimated frame size; and
iteratively calculate an updated packet size, based on at least the estimated frame size and the number of packets, on a packet-by-packet basis, while the encoded video data is packed into an actual bitstream.

13. The non-transitory computer readable medium of claim 12, wherein the program instructions further cause the one or more processors to:
determine a configuration mode to vary a calculation for the number of packets; and
calculate a new target packet size based on the number of packets for the configuration mode and the estimated frame size.

14. The non-transitory computer readable medium of claim 13, wherein the program instructions further cause the one or more processors to estimate the size of the frame to determine the estimated frame size by packing the encoded data into a simulation bitstream.

15. The non-transitory computer readable medium of claim 14, wherein the program instructions further cause the one or more processors to insert a simulation resynchronization marker or simulation slice header in the simulation bitstream.

16. The non-transitory computer readable medium of claim 15, wherein the program instructions further cause the one or more processors to:
pack a current macroblock of the encoded data into the actual bitstream;
look ahead one macroblock in the encoded video data;
evaluate whether a result of a count representative of a size of the current packet size plus a predetermined portion of a count representative of a size of the one macroblock exceeds the updated packet size; and
when the result exceeds the updated packet size and a packet count is less than the number of packets, insert an actual resynchronization marker or an actual slice header before the one macroblock and recalculate the updated packet size.

17. The non-transitory computer readable medium of claim 13, wherein the program instructions further cause the one or more processors to estimate the size of the frame to determine the estimated frame size by calculating a number of non-zero coefficients (NZCs) for a current macroblock of the encoded video data and accumulating the number of NZCs for each macroblock in the frame to form a total frame NZC.

18. The non-transitory computer readable medium of claim 17, wherein the program instructions further cause the one or more processors to calculate the size of the frame to determine the estimated frame size based on the following:

estimated frame size=alpha*total frame NZC+previous non-texture size where alpha is defined by alpha =(previous frame size−previous non-texture size)/previous total frame NZC and where the previous non-texture size is a count representative of non-texture bits in a previous frame, the previous frame size is an actual frame size of the previous frame and the previous total frame NZC is the total frame NZC of the previous frame.

19. The non-transitory computer readable medium of claim 18, wherein the program instructions further cause the one or more processors to:
after packing a current macroblock of the encoded data into the actual bitstream to look ahead one macroblock, evaluate whether a result of a count representative of a current packet size plus a count of the NZCs in the one macroblock multiplied by a predetermined factor is greater than the updated packet size; and
when the result exceeds the updated packet size and a packet count is less than the number of packets, insert an actual resynchronization marker or an actual slice header before the one macroblock and recalculate the updated packet size.

20. The non-transitory computer readable medium of claim 12, wherein the program instructions further cause the one or more processors to estimate the size of the frame to determine the estimated frame size based on the following:

estimated_frame_size=alpha*desired total frame NZC+previous non-texture size where alpha=previous frame size−previous non-texture size)/previous total frame NZC and where the previous non-texture size is a count representative of non-texture bits in a previous frame, the previous frame size is an actual frame size of the previous frame, the previous total frame NZC is a count representative of an accumulation of a previous frame's total non-zero coefficients (NZC) and the desired total frame NZC is an initial fixed value identifying a frame's total non-zero coefficients (NZC).

21. The non-transitory computer readable medium of claim 20, wherein the program instructions further cause the one or more processors to calculate a total frame NZC value representative of a frame's total number of non-zero coefficients (NZC) for a maximum quantization parameter and calculate a target packet NZC value representative of a target packet's number of non-zero coefficients (NZC) based on a rounded result of the total frame NZC value divided by the number of packets, the number of packets being a function of a configuration mode.

22. The non-transitory computer readable medium of claim 21, wherein the program instructions further cause the one or more processors to:
after encoding a current macroblock, calculate a number of non-zero coefficients (NZC) for the current macroblock and packing the current macroblock into the actuale bitstream;
evaluate whether a count representative of a current packet's non-zero coefficients (NZC) is greater than an updated packet NZC value; and
when the result exceeds the updated packet NZC value and a packet count is less than the number of packets, insert a resynchronization marker or a slice header before a next macroblock and recalculate the updated packet NZC value.

23. The non-transitory computer readable medium of claim 21, wherein the maximum quantization parameter is 31 for the encoded video data in a MPEG4 video coding standard format or a H263 video coding standard format, and 52 for the encoded video data in a H264 video coding standard format.

24. A packet-switched video telephony device comprising:
encoding means for encoding a video sequence to create an encoded video data;
video assembling means for assembling the encoded video data into dynamically adjusted packets by estimating a size of a frame of the video sequence to determine an estimated frame size, estimating a number of packets to be generated for a frame based on the estimated frame size and iteratively calculating an updated packet size, based on at least the estimated frame size and the number of packets, on a packet-by-packet basis, while the encoded video data is packed into an actual bitstream; and
transmitting means for transmitting the actual bitstream.

25. The device of claim 24, wherein the video assembling means includes:
determining means for determining the number of packets based on a configuration mode, the estimated frame size and an initial fixed target packet size; and
calculating means for calculating a new target packet size based on the number of packets and the estimated frame size.

26. The device of claim 25, wherein the video assembling means includes estimating means for estimating the size of the frame to determine the estimated frame size by packing the encoded data into a simulation bitstream.

27. The device of claim 26, wherein the estimating means includes inserting means for inserting a simulation resynchronization marker or simulation slice header in the simulation bitstream.

28. The device of claim 27, wherein the video assembling means includes:
   packing means for packing a current macroblock of the encoded data into the actual bitstream;
   looking ahead means for looking ahead one macroblock in the encoded video data;
   evaluating means for evaluating whether a result of a count representative of a size of the current packet size plus a predetermined portion of a count representative of a size of the one macroblock exceeds the updated packet size;
   inserting means for inserting an actual resynchronization marker or an actual slice header before the one macroblock, when the result exceeds the updated packet size; and
   recalculating means for recalculating the updated packet size, when the result exceeds the updated packet size and a packet count is less than the number of packets.

29. The device of claim 25, wherein the video assembling means comprises:
   estimating means for estimating the size of the frame to determine the estimated frame size by calculating a number of non-zero coefficients (NZCs) for a current macroblock of the encoded video data and accumulating the number of NZCs for each macroblock in the frame to form a total frame NZC.

30. The device of claim 29, wherein the estimating means for estimating the size of the frame to determine the estimated frame size calculates the estimated frame size based on the following:

estimated frame size=alpha*total frame NZC+previous non-texture size where alpha is defined by alpha=(previous frame size−previous−non-texture size)/previous total frame NZC and where the previous non-texture size is a count representative of non-texture bits in a previous frame, the previous frame size is an actual frame size of the previous frame and the previous total frame NZC is the total frame NZC of the previous frame.

31. The device of claim 30, wherein the video assembling means comprises:
   looking ahead means for looking ahead one macroblock after packing a current macroblock of the encoded data into the actual bitstream;
   evaluating means for evaluating whether a result of a count representative of a current packet size plus a count of the NZCs in the one macroblock multiplied by a predetermined factor is greater than the updated packet size;
   inserting means for inserting an actual resynchronization marker or an actual slice header before the one macroblock when the result exceeds the updated packet size; and
   recalculating means for recalculating the updated packet size, when the result exceeds the updated packet size and a packet count is less than the number of packets.

32. The device of claim 31, wherein the video assembling means comprise estimating means for estimating the size of the frame to determine the estimated frame size based on the following:

estimated_frame_size=alpha*desired total frame NZC+previous non-texture size where alpha=previous frame size−previous non-texture size)/previous total frame NZC and where the previous non-texture size is a count representative of non-texture bits in a previous frame, the previous frame size is an actual frame size of the previous frame, the previous total frame NZC is a count representative of an accumulation of a previous frame's total non-zero coefficients (NZC) and the desired total frame NZC is an initial fixed value identifying a frame's total non-zero coefficients (NZC).

33. The device of claim 24, wherein the video assembling means comprises:
   calculating means for calculating a total frame NZC value representative of a frame's total number of non-zero coefficients (NZC) for a maximum quantization parameter; and
   calculating means for calculating a target packet NZC value representative of a target packet's number of non-zero coefficients (NZC) based on a rounded result of the total frame NZC value divided by the number of packets, the number of packets being a function of a configuration mode.

34. The device of claim 33, wherein the video assembling means comprises:
   evaluating means for evaluating whether a count representative of a current packet's non-zero coefficients (NZC) is greater than an updated packet NZC value, after encoding a current macroblock, calculating a number of non-zero coefficients (NZC) for the current macroblock and packing the current macroblock into the actual bitstream;
   inserting means for inserting a resynchronization marker or a slice header before a next macroblock, when the result exceeds the updated packet NZC value; and
   recalculating means for recalculating the updated packet NZC value, when the result exceeds the updated packet NZC value and a packet count is less than the number of packets.

35. The device of claim 34, wherein the maximum quantization parameter is 31 for the encoded video data in a MPEG4 video coding standard format or a H263 video coding standard format, and 52 for the encoded video data in a H264 video coding standard format.

36. The device of claim 24, wherein the device comprises one of a cellular telephone, wireless telephone, satellite telephone or other mobile/wireless communication device with a image capturing capability.

37. A method comprising:
   encoding a video sequence to create encoded video data with an encoder; and
   dynamically adjusting packets of the encoded video data with the encoder by estimating a size of a frame of the video sequence to determine an estimated frame size, estimating a number of packets to be generated for a frame, based on an estimated frame size, and iteratively calculating an updated packet size, based on at least the estimated frame size and the number of packets, on a packet-by-packet basis, while the encoded video data is packed into an actual bitstream.

38. The method of claim 37, wherein the dynamically adjusting step comprises the steps of:
   determining the number of packets based on a configuration mode, the estimated frame size and an initial fixed target packet size; and
   calculating a new target packet size based on the number of packets and the estimated frame size.

39. The method of claim 38, wherein estimating the size of the frame comprises estimating the size of the frame to determine the estimated frame size by packing the encoded data into a simulation bitstream.

40. The method of claim 39, wherein the estimating step for estimating the size of the frame to determine the estimated frame size includes the step of inserting a simulation resynchronization marker or simulation slice header in the simulation bitstream.

41. The method of claim 40, wherein dynamically adjusting step includes the steps of:
- packing a current macroblock of the encoded data into the actual bitstream;
- looking ahead one macroblock in the encoded video data;
- evaluating whether a result of a count representative of a size of the current packet size plus a predetermined portion of a count representative of a size of the one macroblock exceeds the updated packet size; and
- inserting an actual resynchronization marker or an actual slice header before the one macroblock, when the result exceeds the updated packet size and recalculating the updated packet size, when the result exceeds the updated packet size and a packet count is less than the number of packets.

42. The method of claim 38,
wherein estimating the size of the frame comprises estimating the size of the frame to determine the estimated frame size by calculating a number of non-zero coefficients (NZCs) for a current macroblock of the encoded video data
wherein the dynamically adjusting step comprises accumulating the number of NZCs for each macroblock in the frame to form a total frame NZC.

43. The method of claim 42, wherein the estimating step for estimating the size of the frame to determine the estimated frame size calculates the estimated frame size based on the following:

estimated frame size=alpha*total frame NZC +previous non-texture size where alpha is defined by alpha=(previous frame size−previous non-texture size)/previous total frame NZC and where the previous non-texture size is a count representative of non-texture bits in a previous frame, the previous frame size is an actual frame size of the previous frame and the previous total frame NZC is the total frame NZC of the previous frame.

44. The method of claim 43, wherein the dynamically adjusting step comprises the steps of:
- after packing a current macroblock of the encoded data into the actual bitstream, looking ahead one macroblock;
- evaluating whether a result of a count representative of a current packet size plus a count of the NZCs in the one macroblock multiplied by a predetermined factor is greater than the updated packet size;
- inserting an actual resynchronization marker or an actual slice header before the one macroblock, when the result exceeds the updated packet size and a packet count is less than the number of packets; and
- recalculating the updated packet size, when the result exceeds the updated packet size and a packet count is less than the number of packets.

45. The method of claim 37, wherein estimating the size of the frame to determine the estimated frame size comprises estimating the size of the frame based on the following:

estimated_frame_size=alpha*desired total frame NZC+previous non-texture size where alpha=previous frame size−previous non-texture size)/previous total frame NZC and where the previous non-texture size is a count representative of non-texture bits in a previous frame, the previous frame size is actual frame size of the previous frame, the previous total frame NZC is a count representative of an accumulation of a previous frame's total non-zero coefficients (NZC) and the desired total frame NZC is an initial fixed value identifying a frame's total non-zero coefficients (NZC).

46. The method of claim 45, wherein the dynamically adjusting step comprises the steps of:
- calculating a total frame NZC value representative of a frame's total number of non-zero coefficients (NZC) for a maximum quantization parameter; and
- calculating a target packet NZC value representative of a target packet's number of non-zero coefficients (NZC) based on a rounded result of the total frame NZC value divided by the number of packets, the number of packets being a function of a configuration mode.

47. The method of claim 46, wherein the dynamically adjusting step comprises the steps of:
- after encoding a current macroblock, calculating a number of non-zero coefficients (NZC) for the current macroblock and packing the current macroblock into the actual bitstream;
- evaluating whether a count representative of a current packet's non-zero coefficients (NZC) is greater than an updated packet NZC value;
- inserting a resynchronization marker or a slice header before a next macroblock, when the result exceeds the updated packet NZC value and a packet count is less than the number of packets; and
- recalculating the updated packet NZC value, when the result exceeds the updated packet NZC value and a packet count is less than the number of packets.

48. The method of claim 47, wherein the maximum quantization parameter is 31 for the encoded video data in a MPEG4 video coding standard format or a H263 video coding standard format, and 52 for the encoded video data in a H264 video coding standard format.

49. An encoder comprising:
- a macroblock encoding module operable to encode a video sequence to create an encoded video data having macroblocks; and
- a packet switched video assembler operable to packetize the encoded video data into dynamically adjusted packets by estimating a size of a frame of the video sequence to determine an estimated frame size, iteratively calculating an updated packet size, on a slice-by-slice basis, while the encoded video data is packed into an actual bitstream, the updated packet sized being a function of the estimated frame size derived from a fixed initial target frame size and an estimated number of packets.

50. The encoder of claim 49, wherein the estimated frame size is calculated by packing the encoded video data into a simulation bitstream and inserting a simulation resynchronization marker or simulation slice marker.

* * * * *